United States Patent
Greene et al.

(10) Patent No.: US 7,540,097 B2
(45) Date of Patent: Jun. 2, 2009

(54) ARTICLE OF FOOTWEAR HAVING AN UPPER WITH A MATRIX LAYER

(75) Inventors: Pamela S. Greene, Portland, OR (US); John Hurd, Tigard, OR (US); John Hoke, III, Portland, OR (US)

(73) Assignee: Nike, Inc., Beaverton, OR (US)

( * ) Notice: Subject to any disclaimer, the term of this patent is extended or adjusted under 35 U.S.C. 154(b) by 324 days.

(21) Appl. No.: 11/340,409

(22) Filed: Jan. 26, 2006

(65) Prior Publication Data

US 2006/0283042 A1    Dec. 21, 2006

Related U.S. Application Data

(60) Provisional application No. 60/692,336, filed on Jun. 20, 2005.

(51) Int. Cl.
*A43B 7/06* (2006.01)
*A43C 11/00* (2006.01)
(52) U.S. Cl. ......................... 36/3 A; 36/50.1
(58) Field of Classification Search .................. 36/3 A, 36/3 R, 50.1, 50.5
See application file for complete search history.

(56) References Cited

U.S. PATENT DOCUMENTS

| | | | |
|---|---|---|---|
| 1,227,981 A | | 5/1917 | Tynes |
| 1,877,080 A | | 9/1932 | Teshima |
| D90,369 S | | 7/1933 | Kaminski |
| D91,999 S | | 4/1934 | Hellbrunn |
| 1,958,135 A | | 5/1934 | Dunbar et al. |
| D95,204 S | | 4/1935 | Haflin |
| 2,052,753 A | * | 9/1936 | Daniels ............... 12/146 R |
| 2,069,381 A | | 2/1937 | Morgan |
| D103,592 S | | 3/1937 | Perugia |
| 2,119,392 A | * | 5/1938 | Levin ............... 36/12 |
| D115,200 S | | 6/1939 | Doree |
| 2,185,762 A | | 1/1940 | Cox |
| 2,188,168 A | * | 1/1940 | Winkel ............... 36/45 |
| 2,350,879 A | * | 6/1944 | Daniels ............... 36/45 |
| D160,838 S | | 11/1950 | Brower |
| D164,847 S | | 10/1951 | Dronoff |
| 2,596,188 A | | 5/1952 | Webb |
| 2,954,617 A | | 10/1960 | Yamaguchi |

(Continued)

FOREIGN PATENT DOCUMENTS

BE    531033    11/1957

(Continued)

OTHER PUBLICATIONS

Partial International Search Report in related PCT application, International Application No. PCT/US2006/023953, mailed Nov. 16, 2006.

*Primary Examiner*—Ted Kavanaugh
(74) *Attorney, Agent, or Firm*—Banner & Witcoff, Ltd.

(57) ABSTRACT

An article of footwear is disclosed that includes an upper and a sole structure. The upper includes a matrix structure that defines a plurality of apertures. The apertures may have an elongate configuration to impart differences in the extensibility of the upper in different directions. For example, the matrix layer may be formed from a plurality of segments that cross each other to define the apertures. A method of manufacturing the article of footwear is also disclosed.

57 Claims, 22 Drawing Sheets

U.S. PATENT DOCUMENTS

| | | |
|---|---|---|
| 4,222,183 A | 9/1980 | Haddox |
| 4,265,032 A * | 5/1981 | Levine ................. 36/11.5 |
| 4,447,967 A | 5/1984 | Zaino |
| D278,947 S | 5/1985 | Foldes |
| D293,964 S | 2/1988 | Baungratz |
| D293,966 S | 2/1988 | Baungratz |
| D293,968 S | 2/1988 | Baungratz |
| 4,813,158 A | 3/1989 | Brown |
| 4,858,339 A * | 8/1989 | Hayafuchi et al. .......... 36/45 |
| D303,729 S | 10/1989 | Macasieb |
| 5,647,150 A | 7/1997 | Romanato et al. |
| D401,051 S | 11/1998 | Hamel |
| 6,401,364 B1 * | 6/2002 | Burt ........................ 36/3 A |
| 6,665,954 B2 | 12/2003 | Chen |
| D498,583 S * | 11/2004 | Yun ........................ D2/972 |

FOREIGN PATENT DOCUMENTS

| | | |
|---|---|---|
| DE | 9213747 U1 | 12/1992 |
| FR | 2853819 | 10/2004 |
| WO | WO 98/43506 | 10/1998 |
| WO | WO 2006/028664 | 3/2006 |
| WO | WO 2006/063019 | 6/2006 |

* cited by examiner

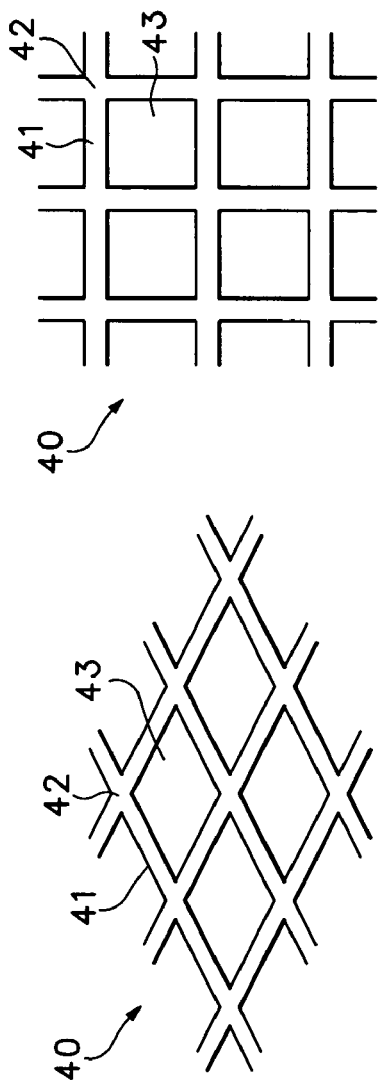
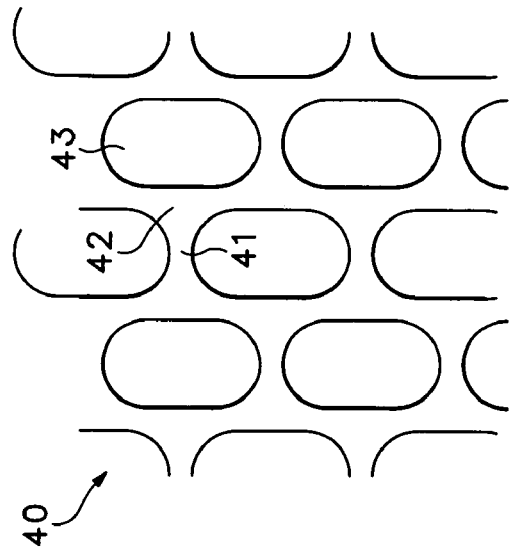
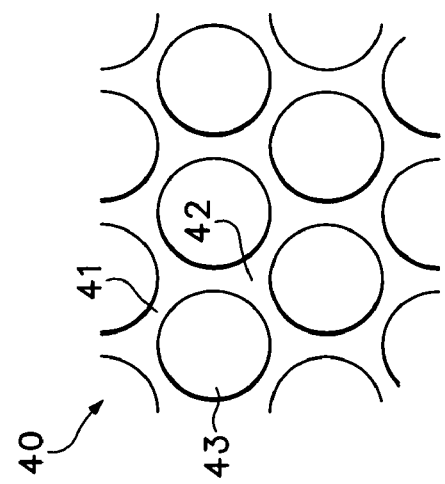
Figure 6A
Figure 6B
Figure 6C
Figure 6D

ARTICLE OF FOOTWEAR HAVING AN UPPER WITH A MATRIX LAYER

CROSS-REFERENCE TO RELATED APPLICATION

This Non-Provisional U.S. patent application is a continuation application of and claims priority to Provisional U.S. Patent Application No. 60/692,336, which was filed in the U.S. Patent and Trademark Office on Jun. 20, 2005 and entitled Article of Footwear Having An Upper With A Matrix Layer, such prior Provisional U.S. Patent Application being entirely incorporated herein by reference.

BACKGROUND

Conventional articles of athletic footwear generally include two primary elements, an upper and a sole structure. The upper is secured to the sole structure and forms a void on the interior of the footwear for comfortably and securely receiving a foot. The sole structure is positioned between the upper and the ground, and the sole structure may include a polymer foam midsole and an outsole. The midsole attenuates ground reaction forces to lessen stresses upon the foot and leg. The outsole forms a ground-engaging portion of the sole structure and is formed from a durable and wear-resistant material. The sole structure may also include a sockliner that is positioned within the void and proximal a lower surface of the foot to enhance footwear comfort.

The upper generally extends over the vamp and toe areas of the foot, along the medial and lateral sides of the foot, and around the heel area of the foot. In some articles of footwear, such as basketball footwear and boots, the upper may extend upward and around the ankle to provide support for the ankle. Access to the void on the interior of the footwear is generally provided by an access opening. A lacing system is often incorporated into the upper to selectively increase the size of the access opening and permit the wearer to modify certain dimensions of the upper, particularly girth, to accommodate feet with varying dimensions. In addition, the upper may include a tongue that extends under the lacing system to enhance comfort of the footwear, and the upper may incorporate a heel counter to limit movement of the heel.

Various materials are conventionally utilized in manufacturing the upper. The upper of athletic footwear, for example, may be formed from multiple material layers that include an exterior layer, an intermediate layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability for various other areas of the exterior layer of the upper. Accordingly, the other areas of the exterior layer may be formed from a synthetic textile, for example. The exterior layer of the upper may be formed, therefore, from numerous material elements that each impart different properties to the upper. The intermediate layer of the upper is conventionally formed from a lightweight polymer foam material that provides cushioning and enhances comfort. Similarly, the interior layer of the upper may be formed of a comfortable and moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

SUMMARY

One aspect of the invention is an article of footwear having an upper and a sole structure. The upper includes a matrix structure that defines a plurality of apertures. The apertures may have an elongate configuration to impart differences in the extensibility of the upper in different directions. As an example, the matrix layer may be formed from a plurality of segments that cross each other to define the apertures. The specific shape of the apertures may vary to include quadrilaterals, hexagons, circles, ovals, triangles, and any other shape.

Another aspect of the invention is a method of manufacturing a first article of footwear and a second article of footwear. The method includes a step of forming a first polymer element with a mold such that the first polymer element defines a plurality of first apertures with an elongate configuration. The first polymer element is secured to a first sole structure to form at least a portion of a first upper, and the first sole structure has a first length. A second polymer element is formed with the mold, the second polymer element being substantially identical to the first polymer element. The second polymer element is secured to a second sole structure to form at least a portion of a second upper. The second sole structure has a second length, and the second length is greater than the first length.

The advantages and features of novelty characterizing various aspects of the invention are pointed out with particularity in the appended claims. To gain an improved understanding of the advantages and features of novelty, however, reference may be made to the following descriptive matter and accompanying drawings that describe and illustrate various embodiments and concepts related to the aspects of the invention.

DESCRIPTION OF THE DRAWINGS

The foregoing Summary, as well as the following Detailed Description, will be better understood when read in conjunction with the accompanying drawings.

FIGS. 6A-6H depict various alternate configurations for the matrix layer.

DETAILED DESCRIPTION

Figure 1:
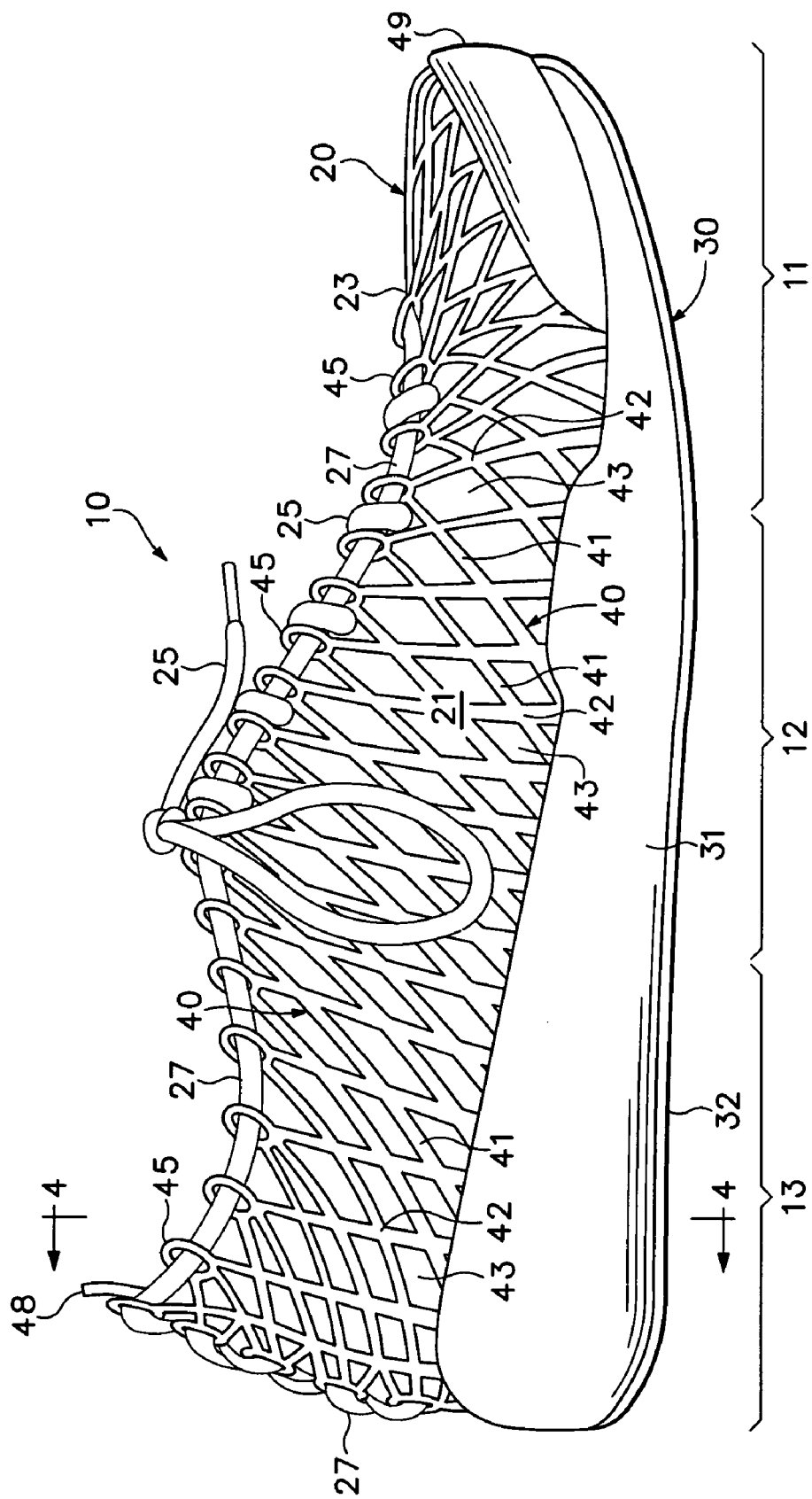
FIG. 1 is a lateral side elevational view of an article of footwear having an upper with a matrix layer in accordance with aspects of the invention.

The following discussion and accompanying figures disclose various articles of footwear having uppers with polymer matrix layers in accordance with aspects of the present invention. Concepts related to the polymer matrix layers are disclosed with reference to various articles of athletic footwear having configurations suitable for the sports of running and basketball. The polymer matrix layers are not solely limited to footwear designed for running and basketball, however, and may be incorporated into a wide range of athletic footwear styles, including shoes that are suitable for baseball, basketball, cross-training, football, rugby, soccer, tennis, volleyball, and walking, for example. In addition, the polymer matrix layers may be incorporated into footwear that is generally considered to be non-athletic, including a variety of dress shoes, casual shoes, sandals, and boots. An individual skilled in the relevant art will appreciate, therefore, that the concepts disclosed herein with regard to the polymer matrix layers apply to a wide variety of footwear styles, in addition to the specific styles discussed in the following material and depicted in the accompanying figures.

An article of footwear 10 is depicted in FIGS. 1-4 as including an upper 20 and a sole structure 30. For purposes of reference in the following material, footwear 10 may be divided into three general regions: a forefoot region 11, a midfoot region 12, and a heel region 13, as defined in FIGS. 1 and 2. Regions 11-13 are not intended to demarcate precise areas of footwear 10. Rather, regions 11-13 are intended to represent general areas of footwear 10 that provide a frame of reference during the following discussion. Although regions 11-13 apply generally to footwear 10, references to regions 11-13 may also apply specifically to upper 20, sole structure 30, or an individual component within either upper 20 or sole structure 30.

Upper 20 is secured to sole structure 30 and defines a void for receiving a foot. For purposes of reference, upper 20 includes a lateral side 21, an opposite medial side 22, and a vamp area 23. Lateral side 21 is positioned to extend along a lateral side of the foot and generally passes through each of regions 11-13. Similarly, medial side 22 is positioned to extend along an opposite medial side of the foot and generally passes through each of regions 11-13. Vamp area 23 is positioned between lateral side 21 and medial side 22 to correspond with an upper surface of the foot. Vamp area 23 includes a throat 24 having a lace 25 or any other closure mechanism that is utilized in a conventional manner to modify the dimensions of upper 20 relative the foot, thereby adjusting the fit of footwear 10. Upper 20 also includes an ankle opening 26 that provides the foot with access to the void within upper 20.

Upper 20 also includes a heel element 48 and a toe element 49. Heel element 48 extends upward and along the interior surface of upper 20 to enhance the comfort of footwear 10. Toe element 49 is located in forefoot region 11 and on an exterior surface of upper 20 to provide wear-resistance and assist with positioning of the foot. In some embodiments one or both of heel element 48 and toe element 49 may be absent, or heel element 48 may be positioned on the exterior surface, for example.

Sole structure 30 is secured to a lower surface of upper 20 and has a generally conventional structure that includes a midsole 31, an outsole 32, and a sockliner 33. Midsole 31 may be formed of polymer foam material, such as polyurethane or ethylvinylacetate, that compresses to attenuate ground reaction forces during walking, running, or other ambulatory activities. In some aspects of the invention, the polymer foam material may encapsulate or include various elements, such as a fluid-filled bladder or moderator, that enhance the comfort, motion-control qualities, stability, or ground reaction force attenuation of footwear 10. Outsole 32 is secured to a lower surface of midsole 31 and is formed of a wear-resistant material, such as rubber, that contacts the ground during the ambulatory activities. The material forming outsole 32 may be textured to impart enhanced traction and slip resistance. Sockliner 33 is a thin, compressible member that is located within the void in upper 20 and adjacent to a lower surface of the foot to enhance the comfort of footwear 10. Although the configuration of sole structure 30 discussed above is suitable for footwear 10, sole structure 30 may exhibit the configuration of any conventional or non-conventional sole structure.

At least a portion of upper 20 includes a matrix layer 40 formed from a plurality of segments 41 that cross at various intersections 42. This configuration of segments 41 imparts the structure of a matrix and defines a plurality of apertures 43 in matrix layer 40. As utilized herein, the term "matrix" is intended to encompass a variety of configurations, including nets, grids, lattices, webs, and perforated materials, for example, that form apertures. Matrix layer 40 may be formed of unitary (i.e., one-piece) construction from polymer materials that include rubber, silicone, thermoplastic polyurethane, polypropylene, polyethylene, ethylvinylacetate, and styrene ethylbutylene styrene, for example. Although the hardness of the polymer material may vary significantly within the scope of various aspects of the invention, a polymer having a hardness of 98 or less on the Shore A scale enhances the comfort and flexibility of matrix layer 40, while continuing to provide support for the foot. In manufacturing matrix layer 40, the polymer material may be molded through an injection molding process, as described below, to impart the unitary construction. As an alternative, however, individual elements corresponding to segments 41 may be joined at intersections 42 to form a structure having the characteristics of matrix layer 40. For example, individual segments 41 may be bonded or adhered to each other so as to form matrix layer 40. Furthermore, matrix layer 40 may be laser cut or die cut to define segments 41, intersections 42, and apertures 43.

Matrix layer 40 provides a comfortable and compliant structure that extends adjacent to the foot. As described in greater detail below, matrix layer 40 stretches to accommodate foot movements and differences in foot dimensions. That is, the stretchability of matrix layer 40 ensures that footwear 10 may accommodate feet with a variety of proportions. matrix layer 40 also provides a lightweight structure in upper 20, and apertures 43 impart a relatively high degree of air permeability to footwear 10. These advantages will be more apparent based upon material presented in the following discussion.

Figure 5:
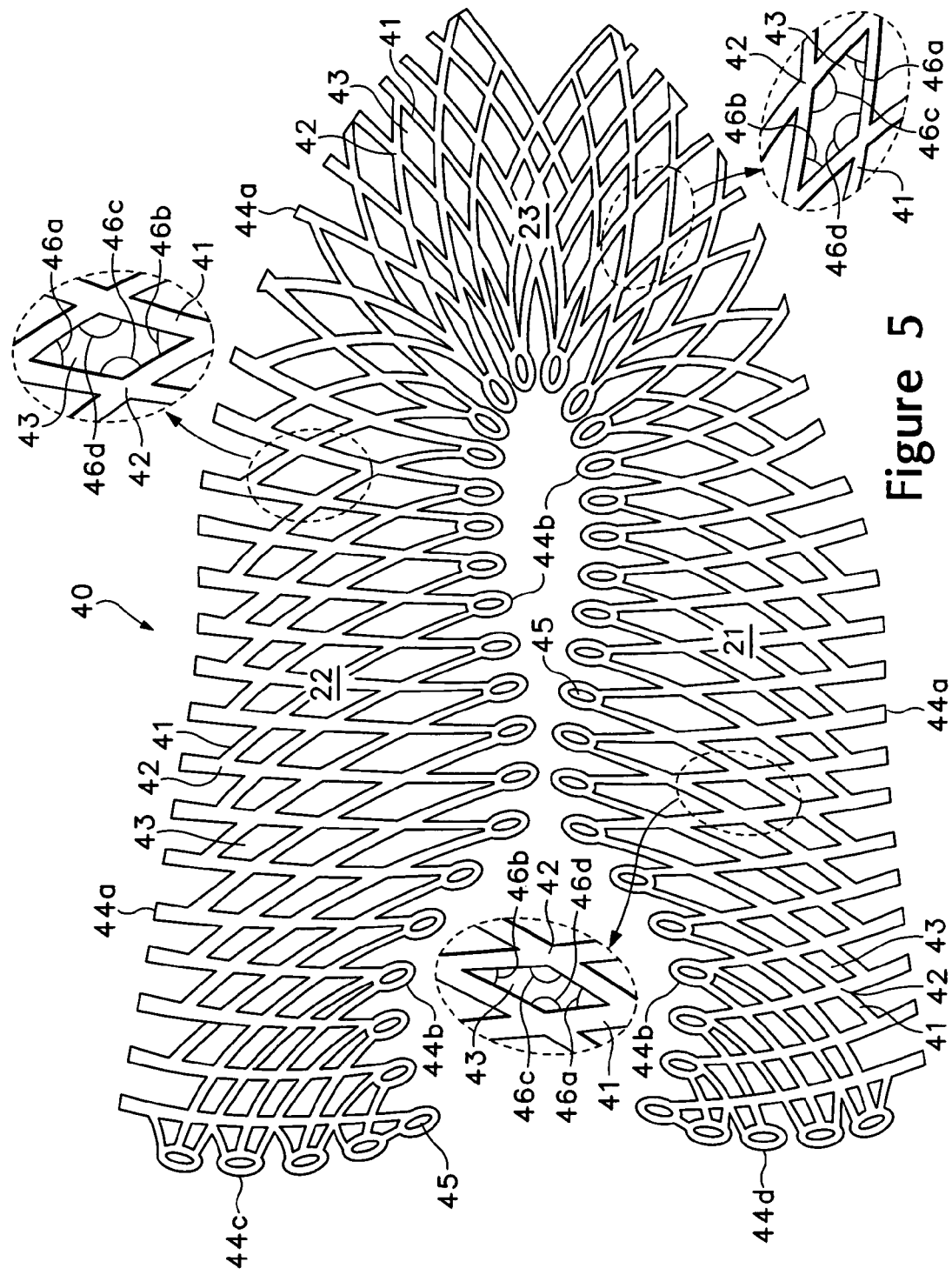
FIG. 5 is a top plan view of the matrix layer.

Matrix layer 40 is depicted individually in FIG. 5. For purposes of reference, numerals 21-23 are shown on FIG. 5 in order to demonstrate which areas of matrix layer 40 correspond with lateral side 21, medial side 22, and vamp area 23. In general, matrix layer 40 has a U-shaped configuration with a central area (vamp area 23) and a pair of side areas (lateral side 21 and medial side 22) extending from the central area. Terminal ends of the various segments 41 form a periphery of matrix layer 40 and define four edges 44a-44d. Edge 44a is an outermost edge of matrix layer 40, edge 44b is spaced inward from edge 44a, and each of edges 44c and 44d extend between edges 44a and 44b.

When matrix layer 40 is incorporated into footwear 10, edge 44a is positioned adjacent sole structure 30 and may be joined with sole structure 30. The portion of edge 44b that is positioned adjacent to the central area defines throat 24, and the portion of edge 44b that is positioned adjacent edges 44c and 44d defines ankle opening 26. Edges 44c and 44d are joined to each other in heel region 13 and extend vertically between sole structure 30 and ankle opening 26. As noted above, terminal ends of the various segments 41 define edges 44a-44d. Along each of edges 44b-44d, the terminal ends of segments 41 form a plurality of loops 45 with a circular shape, elliptical shape, or any other practical shape. As depicted in FIGS. 1-4, a cord 27 extends through loops 45 and is utilized to join edges 44c and 44d to each other. When cord 27 extends through loops 45, loops 45 may rotate to accommodate cord 27. Forming loops 45 at ends areas of segments 41 facilitates this rotation of loops 45.

Segments 41 intersect or otherwise cross each other at intersections 42. The orientations and overall positions of segments 41 have an effect upon the shape of apertures 43. As depicted in each of FIGS. 1-5, apertures 43 are formed to exhibit an elongate and quadrilateral-shaped configuration (e.g., a diamond-shaped configuration). More particularly, a majority of segments 41 are oriented to generally extend between edges 44a and 44b, and this orientation forms apertures 43 to be longer in a direction that is perpendicular to edges 44a and 44b than in a direction that is parallel to edges 44a and 44b.

The orientation of segments 41 and the resulting shape of apertures 43 has an effect upon the directional extensibility (i.e., stretchability) of matrix layer 40. As discussed above, apertures 43 have an elongate and quadrilateral-shaped configuration, and apertures 43 are longer in the direction that is perpendicular to edges 44a and 44b than in the direction that is parallel to edges 44a and 44b. In this configuration, matrix layer 40 has greater extensibility in the direction that is parallel to edges 44a and 44b, and matrix layer 40 has lesser extensibility in the direction that is perpendicular to edges 44a and 44b. Accordingly, the degree to which matrix layer 40 stretches depends upon the direction in which matrix layer 40 is stretched.

The directional differences in extensibility are due, in part, to relative angles that form the elongate and quadrilateral-shaped configuration of apertures 43. With reference to FIG. 5, various apertures 43 are referenced as having four angles 46a-46d. Each angle 46a is oriented such that a vertex of angle 46a points toward edge 44a. Each angle 46b is positioned opposite an angle 46a and oriented such that a vertex of angle 46b points toward edge 44b. Similarly, angles 46c and 46d are positioned opposite each other and vertices of angles 46c and 46d point respectively toward edges 44c and 44d. In other words, the vertices of angles 46a and 46b point in the direction that is perpendicular to edges 44a and 44b, and the vertices of angles 46c and 46d point in the direction that is parallel to edges 44a and 44b. As an additional point, each intersection 42 also forms each of angles 44a-44d.

Whereas angles 46a and 46b are acute angles, angles 46c and 46d are obtuse angles when matrix layer 40 is in an unstretched, uncompressed, or otherwise undeformed state. In terms of radians, each of angles 46a and 46b have a value of less than $0.50\pi$ radians, and each of angles 46c and 46d have a value of greater than $0.50\pi$ radians. More particularly, angles 46a and 46b may have a radian measurement of $0.25\pi$ radians (i.e., 45 degrees), but may range from $0.01\pi$ to $0.49\pi$ radians, for example. Correspondingly, angles 46c and 46d may have a radian measurement of $0.75\pi$ (i.e., 135 degrees) radians, but may range from $0.51\pi$ to $0.99\pi$ radians, for example. When matrix layer 40 is stretched, the relative radian measurement of each of angles 46a-46d changes based upon the direction in which matrix layer 40 is stretched.

When matrix layer 40 is stretched in the direction that is perpendicular to edges 44a and 44b, the radian measurement of angles 46a and 46b decreases and the radian measurement of angles 46c and 46d increases. More particularly, the radian measurement of angles 46a and 46b will approach zero upon the application of a tensile force in the direction that is perpendicular to edges 44a and 44b. If further tensile force is applied, segments 41 will stretch in length to resist the tensile force. Given that angles 46a and 46b are acute angles, the radian measurement of angles 46a and 46b need only change to a relatively small degree in order to reduce the radian measurement to zero.

Conversely, when matrix layer 40 is stretched in the direction that is parallel to edges 44a and 44b, the radian measurement of angles 46c and 46d decreases and the radian measurement of angles 46a and 46b increases. More particularly, the radian measurement of angles 46c and 46d will approach zero upon the application of sufficient tensile force in the direction that is parallel to edges 44a and 44b. If further tensile force is applied, segments 41 will stretch in length to resist the tensile force. Given that angles 46c and 46d are obtuse angles, the radian measurement of angles 46a and 46b must change a relatively large degree in order to reduce the radian measurement to zero.

Based upon the above discussion, changes in the radian measurements of angles 46a-46d occur upon the application of tensile forces. Differences in the radian measurements of angles 46a and 46b and the radian measurements of angles 46c and 46d have an effect upon the extensibility of matrix layer 40 in specific directions. That is, the acute nature of angles 46a and 46b permits a relatively small degree of extensibility in the direction that is perpendicular to edges 44a and 44b. The obtuse nature of angles 46c and 46d, however, permit a relatively large degree of extensibility in the direction that is parallel to edges 44a and 44b. Accordingly, matrix layer 40 is configured to have greater extensibility in the direction that is parallel to edges 44a and 44b.

When incorporated into footwear 10, the differences in directional extensibility have an effect upon the overall fit and adjustability of footwear 10. The tightening of lace 25 effectively induces a tensile force in the direction that is perpendicular to edges 44a and 44b, at least in the area of throat 24. Given the relatively low degree of stretch in this direction, the wearer is capable of tightening upper 20 to a degree that comfortably, but securely, holds the foot positioned with respect to sole structure 30. In areas that are adjacent to throat 24, matrix layer 40 still has the capacity, however, to stretch in the direction that is parallel to edges 44a and 44b. During ambulatory activities, therefore, matrix layer 40 will stretch in the direction that is parallel to edges 44a and 44b in order to accommodate flexing or other movements of the foot.

Matrix layer 40 also provides comfort in forefoot region 11. Note that in forefoot region 11, the direction that is perpendicular to edges 44a and 44b extends in a longitudinal direction of footwear 10. Matrix layer 40 stretches, therefore, a relatively small degree in the longitudinal direction in forefoot region 11. In the direction that is parallel to edges 44a and 44b in forefoot region 11, matrix layer 40 stretches to a larger degree. Accordingly, matrix layer 40 stretches to accommodate movements or changes in the dimensions of the forefoot, which includes the toes and ball of the foot. When, for example, the foot rolls forward such that the heel leaves the ground and the metacarpo-phalangeal joints are flexed, the foot may expand slightly in the medial to lateral direction at the metacarpo-phalangeal joints. Given that matrix layer 40 stretches in the medial to lateral direction, these movements of the foot are unrestricted.

The degree to which matrix layer 40 stretches upon the application of a tensile force is at least partially dependent upon the shape of apertures 43, as discussed above. Other factors, including the materials that form matrix layer 40 and the thickness of segments 41, will also have an effect upon the degree to which matrix layer 40 stretches. For many of the polymer materials listed above, a suitable ratio of the area of apertures 43 to the area of segments 41 may be at least 1.5:1.

Figure 6F:
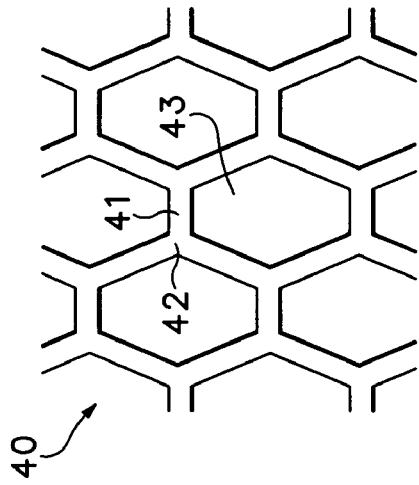
Figure 6H:
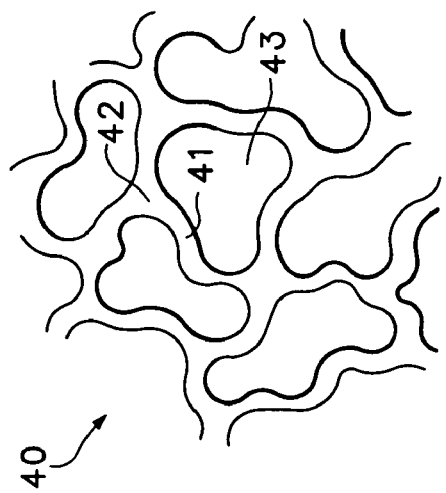
Figure 6E:
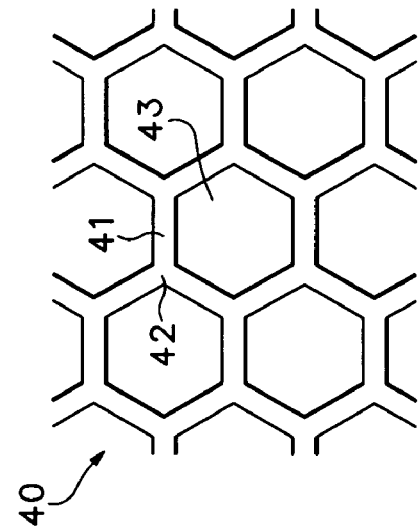
Figure 6G:
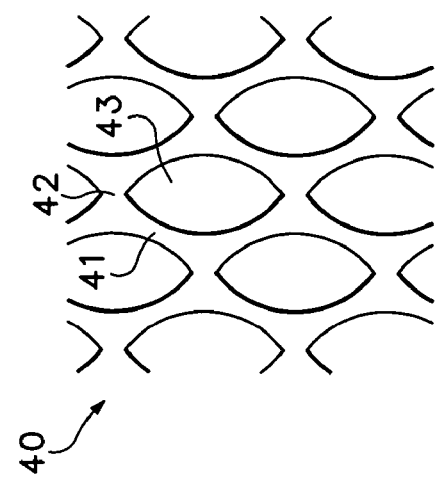

As discussed above, apertures 43 have an elongate and quadrilateral-shaped configuration, and apertures 43 are longer in the direction that is perpendicular to edges 44a and 44b than in the direction that is parallel to edges 44a and 44b. In some articles of footwear, forming apertures 43 with other configurations may be beneficial. With reference to FIG. 6A, a portion of an alternate configuration of matrix layer 40 is depicted, wherein apertures 43 are longer in the direction that is parallel to edges 44a and 44b than in the direction that is perpendicular to edges 44a and 44b. FIG. 6B depicts another configuration, wherein apertures 43 have a square or otherwise non-elongate shape. With reference to FIG. 6C, apertures 43 are depicted as having a round shape. Apertures 43 may also exhibit an oval shape, as depicted in FIG. 6D. In some embodiments, apertures 43 may be formed to have a hexagonal shape, as depicted in FIGS. 6E and 6F. Furthermore, apertures 43 may have shapes similar to shapes depicted in FIGS. 6G and 6H. Accordingly, the shapes of apertures 43 may vary significantly.

Figure 2:
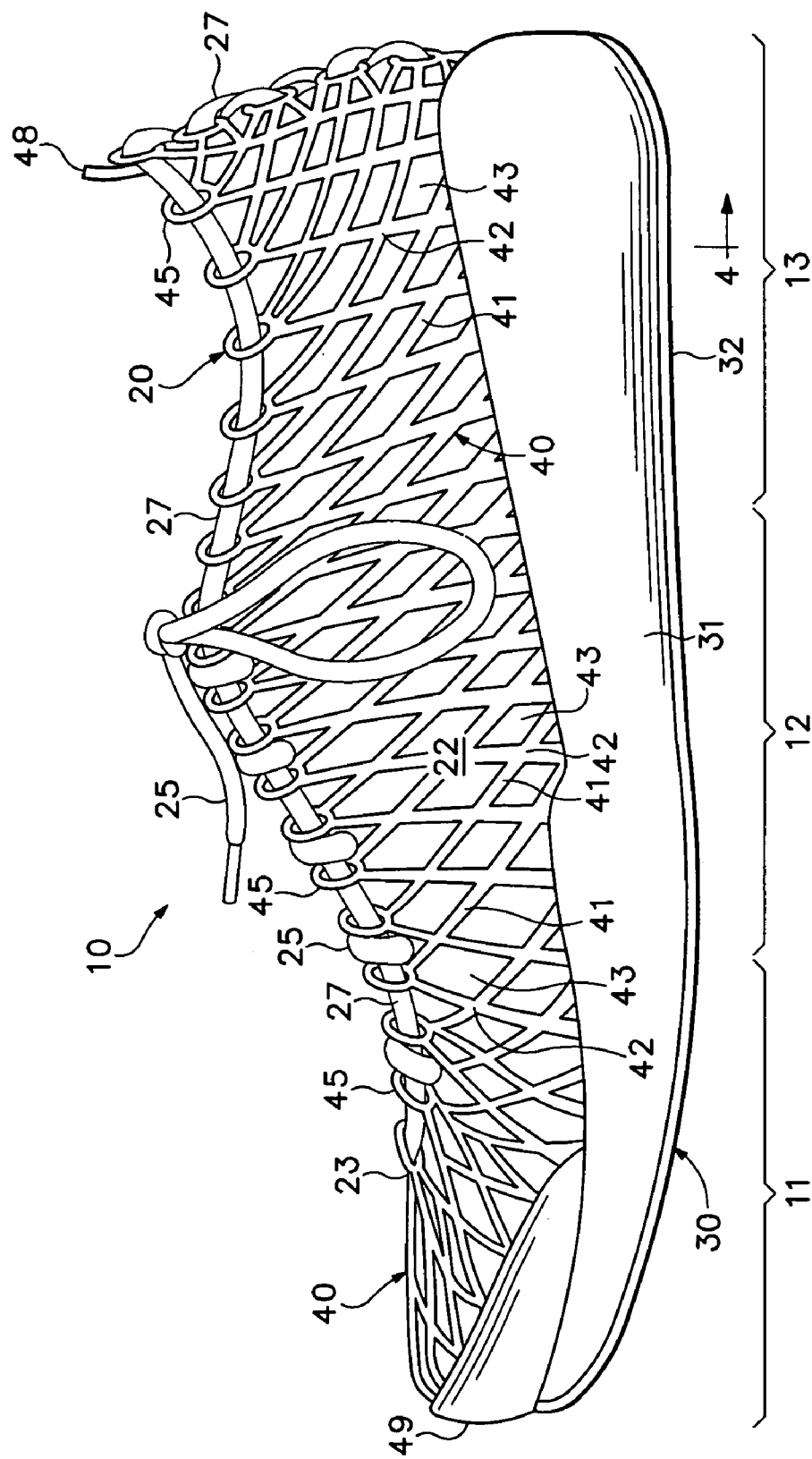
FIG. 2 is a medial side elevational view of the article of footwear.
Figure 3:
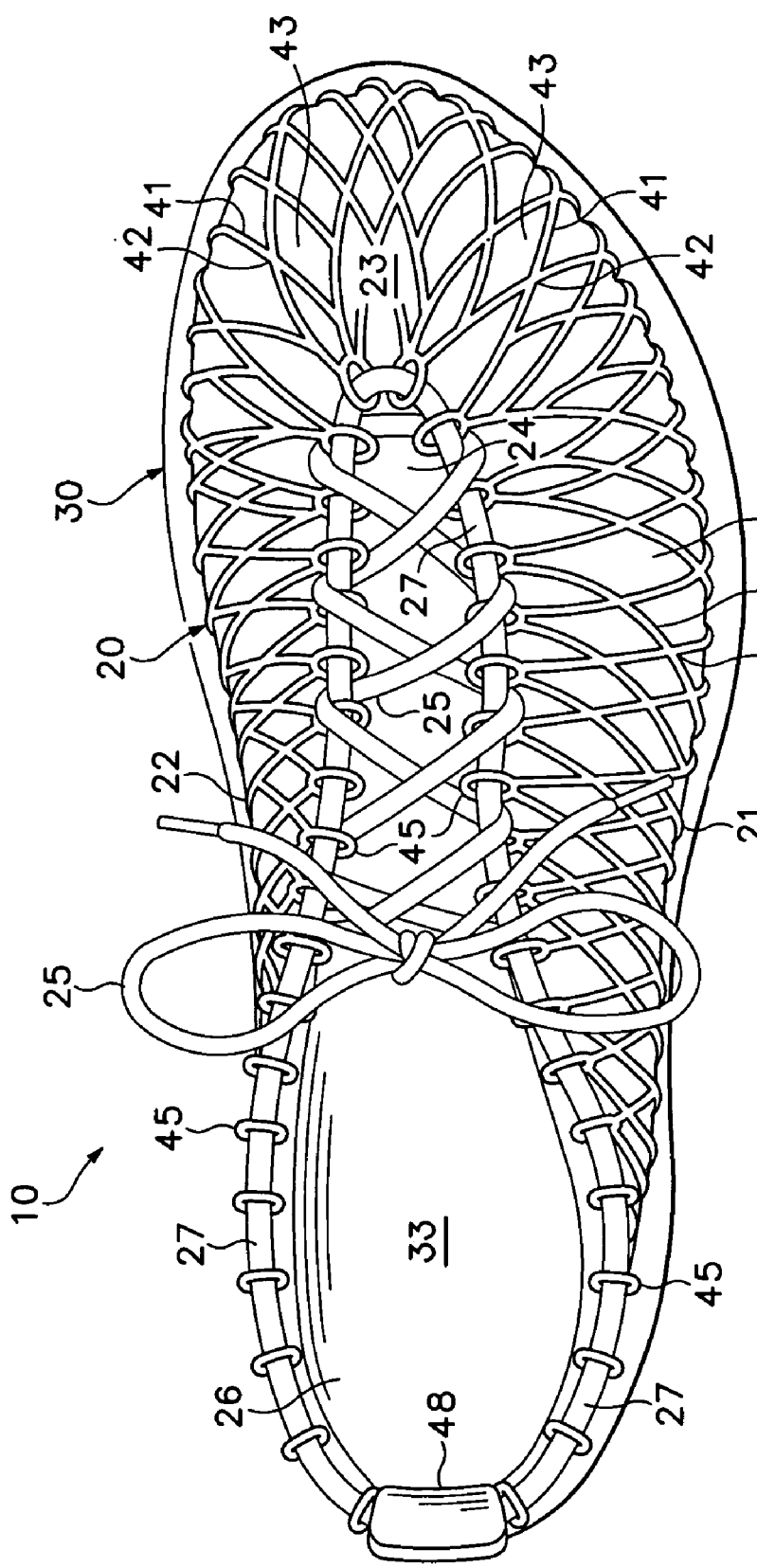
FIG. 3 is a top plan view of the article of footwear.
Figure 4:
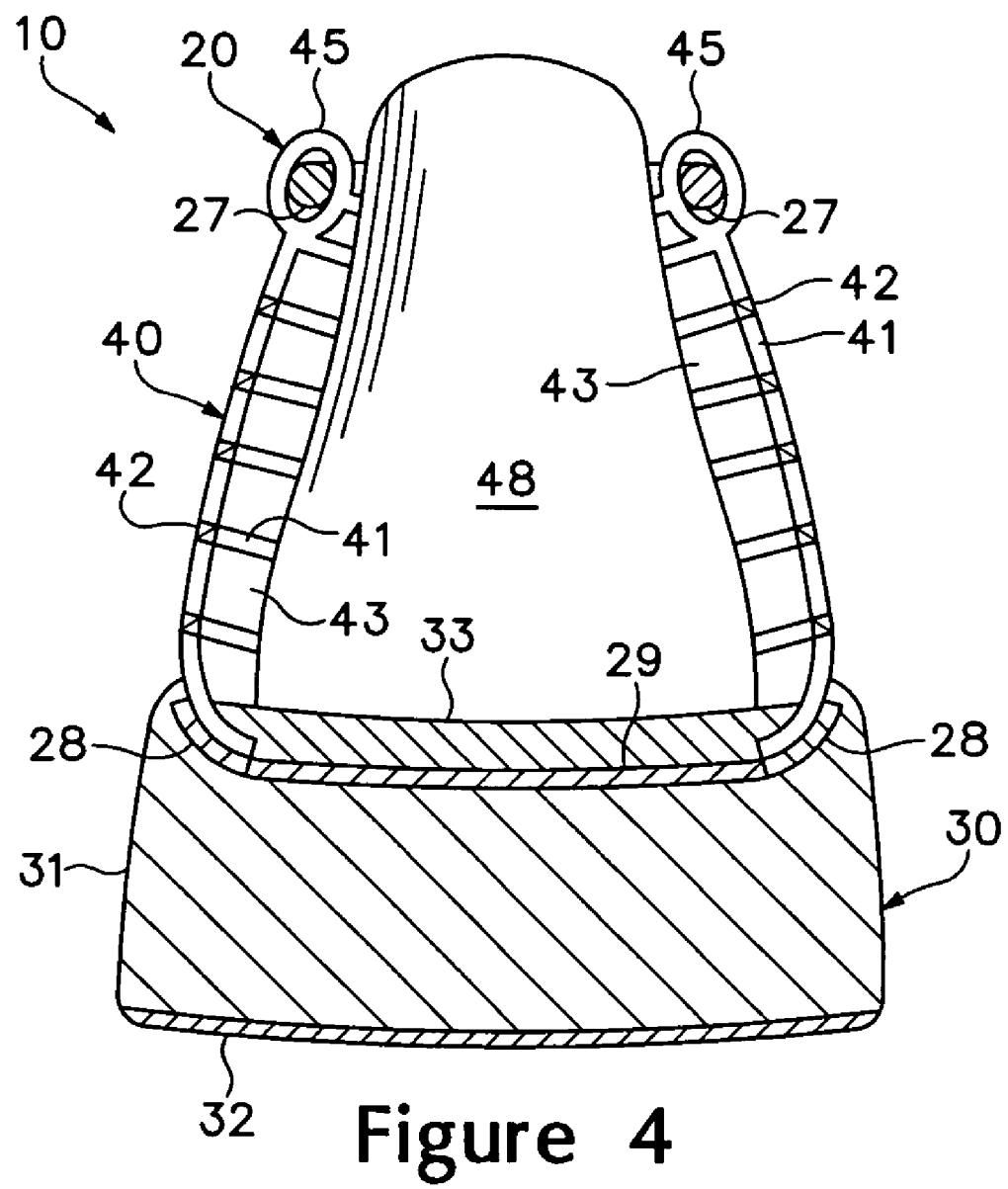
FIG. 4 is a cross-sectional view of the article of footwear, as defined by section line 4-4 in FIG. 3.

Matrix layer 40 is depicted in FIGS. 1-3 as forming a majority of upper 20. In further aspects of the invention, however, upper 20 may include multiple layers having different materials or different combinations of materials, and matrix layer 40 may form at least one of the layers or a portion of at least one of the layers. As an example, an element having the general configuration of matrix layer 40 may be limited to forefoot region 11 or heel region 13, with a remainder of upper 20 having another configuration. Furthermore, a bootie or sock may be placed into the void within upper 20 such that the bootie or sock receives the foot and extends between the foot and matrix layer 40 when footwear 10 is worn.

The thickness of the various segments 41 may be substantially constant. In some embodiments, the thickness of segments 41 may taper between edges 44a and 44b such that segments 41 have greater thickness adjacent edge 44a and lesser thickness adjacent edge 44b. The thickness may also vary such that segments 41 in heel region 13 are thinner than segments 41 in regions 11 and 12, for example. The cross-sectional shape of segments 41 may also vary to include circular, elliptical, square, rectangular, or triangular shapes, for example. If formed from an elliptical or rectangular shape, the cross-section has greater length than thickness, and the longer surface may rest adjacent the foot.

Figure 7A:
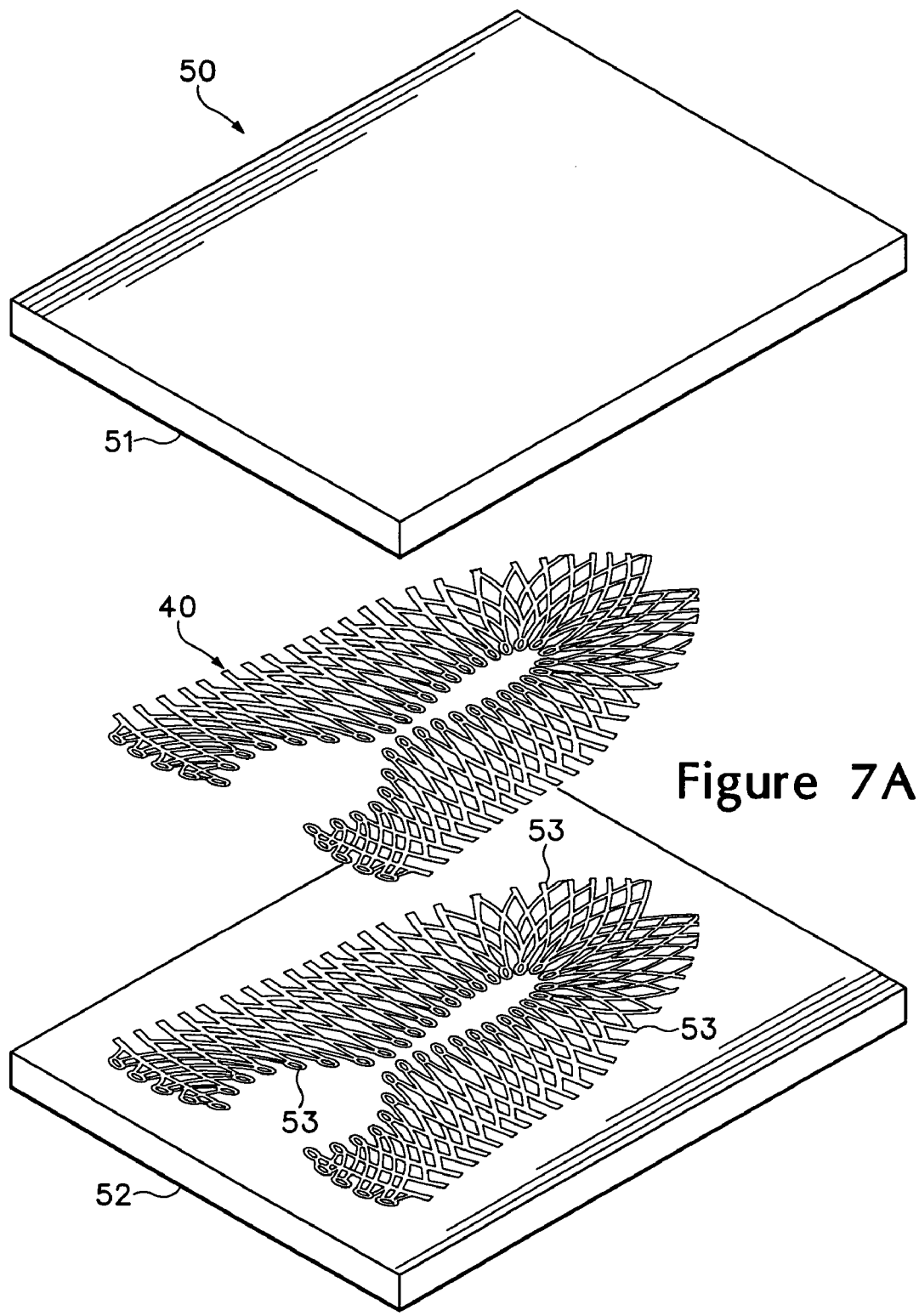
FIGS. 7A-7D depict steps in a manufacturing process of the article of footwear.

The manner in which footwear 10 is manufactured will now be discussed with reference to FIGS. 7A-7D. Matrix layer 40 may be formed of unitary (i.e., one-piece) construction from polymer materials in a mold 50, as depicted in FIG. 7A. Mold 50 includes an upper portion 51 and a lower portion 52. As depicted, a surface of lower portion 52 includes an indented area 53 having the general shape of matrix layer 40. As an alternative, upper portion 51 or both of portions 51 and 52 may have an indented portion in the shape of matrix layer 40. In use, portions 51 and 52 are placed in an overlapping and contacting position, and a polymer material is injected into indented area 53. Upon curing or hardening of the polymer material, portions 51 and 52 are separated and matrix layer 40 is removed, as depicted in FIG. 7A.

Figure 7B:
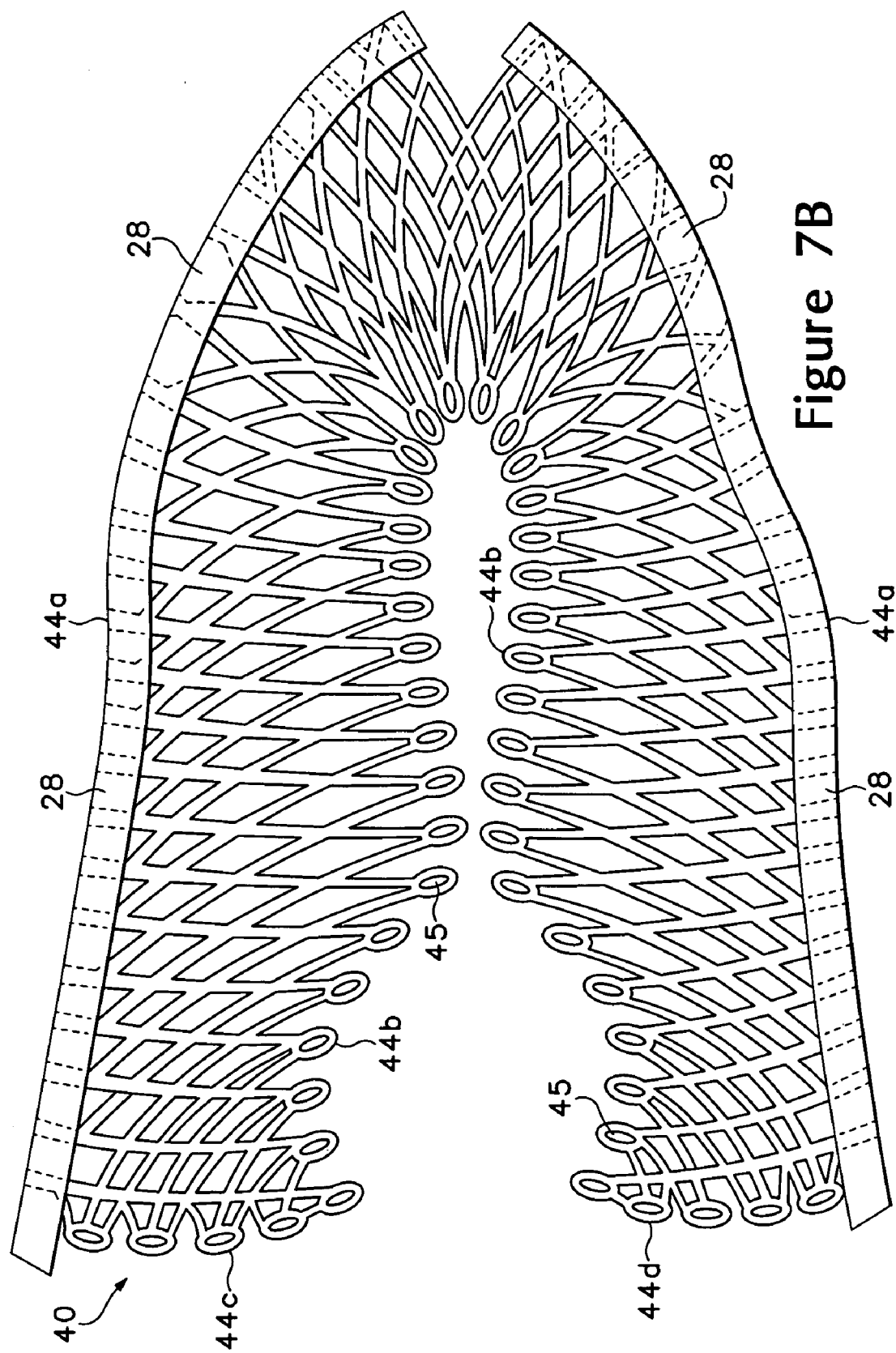

Upon removal of matrix layer 40 from mold 50, a lasting element 28 is secured adjacent to edge 44a, as depicted in FIG. 7B. Lasting element 28 may be adhesively secured to matrix layer 40. When matrix layer 40 is formed from a thermoplastic polymer, however, bonding may be used to join matrix layer 40 to lasting element 28. Suitable materials for lasting element 28 include various textiles, whether woven or non-woven, or polymer sheet materials, for example. As an alternative, lasting element 28 may be located in mold 50 (i.e., in indented area 53) prior to injecting the polymer material. When the polymer material is injected into mold 50, portions of the polymer material contact lasting element 28 and cure or otherwise harden or become polymerized, thereby securing lasting element 28 to matrix layer 40. In some embodiments, a glueless configuration may be utilized wherein portions of matrix layer 40 are mechanically joined to lasting element 28.

Figure 7C:
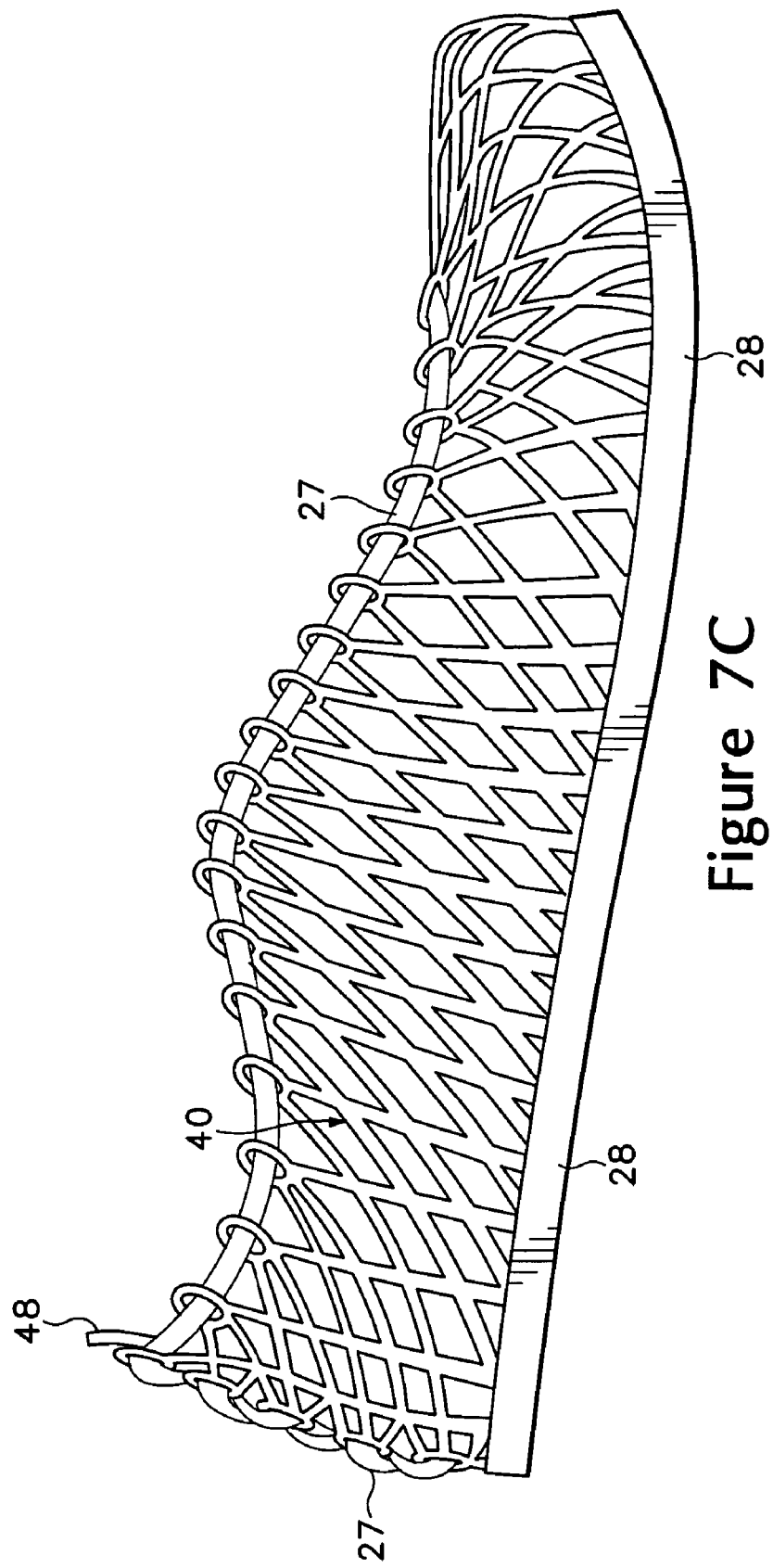

Once lasting element 28 is secured to edge 44a, cord 27 is incorporated into matrix layer 40, as depicted in FIG. 7C. As noted above, cord 27 extends through loops 45 and is utilized to join edges 44c and 44d to each other. More particularly, cord 27 extends through loops 45 in throat 24, through loops 45 adjacent to ankle opening 26, and through loops 45 that form edges 44c and 44d. Prior to incorporating cord 27, edges 44c and 44d are placed adjacent to each other. Cord 27 is then extended through loops 45 along edges 44c and 44d to join edges 44c and 44d to each other. As seen in FIG. 7C, incorporating cord 27 into matrix layer 40 in this manner begins to form matrix layer 40 into the general shape of upper 20. In addition, heel element 48 may be incorporated at this time. As an alternative to using a single cord 27, two or more cords 27 may be utilized, as discussed in greater detail below.

Figure 7D:
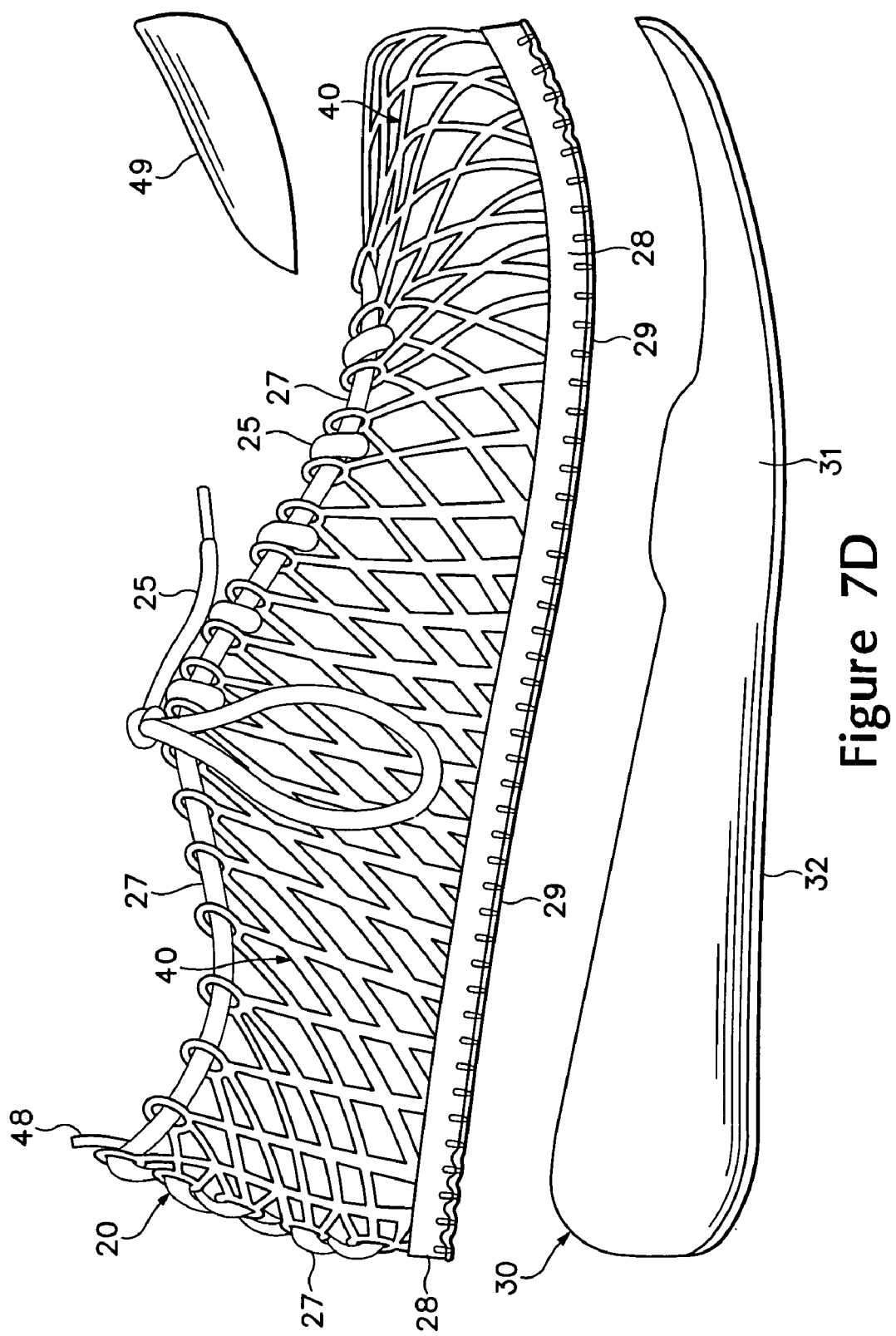

A further step in the process for manufacturing footwear 10 is depicted in FIG. 7D, wherein lace 25 and a strobel sock 29 are joined with matrix layer 40. When cord 27 extends though loops 45, apertures are formed between various segments 41 and cord 27 in at least throat 24, and lace 25 may be threaded through these apertures. Accordingly, lace 25 may be incorporated into upper 20 so as to extend in a zigzag pattern across throat 24. Strobel sock 29 forms a lower surface of the void within upper 20. As discussed above, lasting element 28 is joined to edge 44a. In order to join strobel sock 29 to matrix layer 40, strobel sock 29 may be stitched, adhesively-bonded, or otherwise joined to lasting element 28. Sole structure 30 is then joined to upper 20 to effectively complete the manufacture of footwear 10. In addition, toe element 49 may be incorporated at this time. In some embodiments, a glueless configuration may be utilized wherein portions of matrix layer 40 or lasting element 28 are mechanically joined to sole structure 30. Furthermore, in areas where matrix layer 20 extends around forefoot region 11 or heel region 13, lasting element 28 may be gathered, as depicted in FIG. 7D, to facilitate the rounded configuration of upper 20 in these areas. That is, lasting element 28 facilitates gathering of matrix layer 40 during the manufacturing process.

Figure 8:
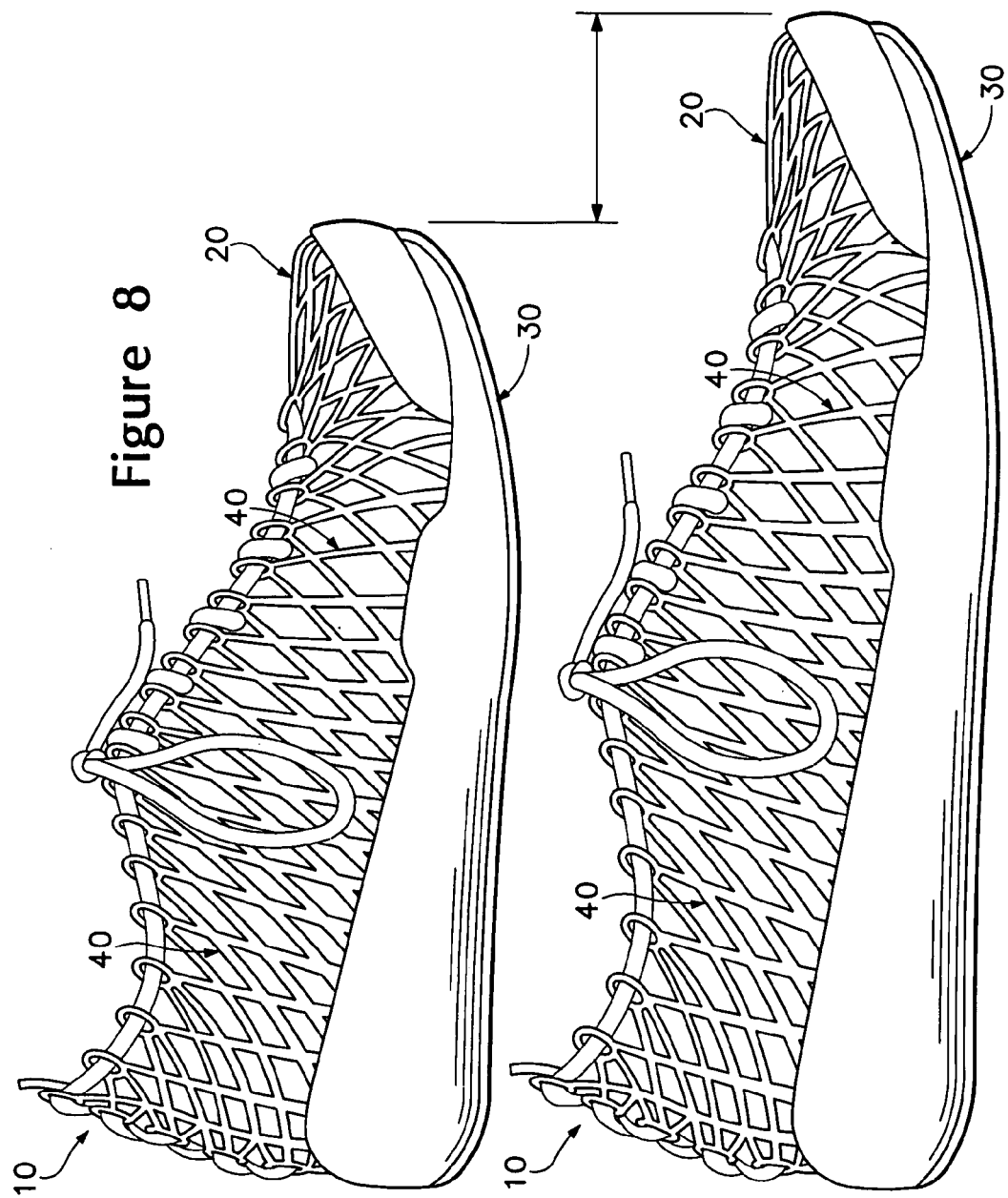
FIG. 8 depicts lateral side elevational views of two articles of footwear having uppers with matrix layers in accordance with aspects of the invention.

In conventional articles of footwear, the upper is formed to accommodate footwear having a specific size. For example, an upper that is formed for a size 10 is larger than an upper that is formed for a size 9.5. An advantage to utilizing matrix layer 40 is that one size of matrix layer 40 may be used in a range of footwear sizes. For example, a single mold may be utilized to form five substantially identical matrix layers 40, and the matrix layers 40 may be incorporated into individual articles of footwear that are sized from 8 to 10. As discussed above, matrix layer 40 is configured to have greater extensibility in the direction that is parallel to edges 44a and 44b. By stretching matrix layer 40 as it is incorporated into an upper, matrix layer 40 may be incorporated into footwear having successively larger sizes. In some circumstances, compressing matrix layer 40 may be utilized to incorporate matrix layer 40 into successively smaller articles of footwear. That is, an individual matrix layer 40 may be incorporated into articles of footwear sized to accommodate a range of foot sizes, as depicted in FIG. 8.

The ability to utilize an individual matrix layer 40 in a variety of footwear sizes enhances the manufacturing efficiency of footwear 10. An individual matrix layer 40 may also be utilized to form footwear 10 to accommodate either the right foot or left foot. As depicted in FIG. 5, matrix layer 40 has a generally symmetrical structure and may, therefore, be incorporated into either the right foot or left foot versions of footwear 10. In circumstances where matrix layer 40 is not symmetrical, merely flipping or otherwise reversing the orientation of matrix layer 40 may permit an individual matrix layer 40 to accommodate either the right foot or left foot. Accordingly, the manufacturing efficiency of footwear 10 is further enhanced in that one configuration of matrix layer 40 is suitable for either the right foot or left foot versions of footwear 10.

Figure 9A:
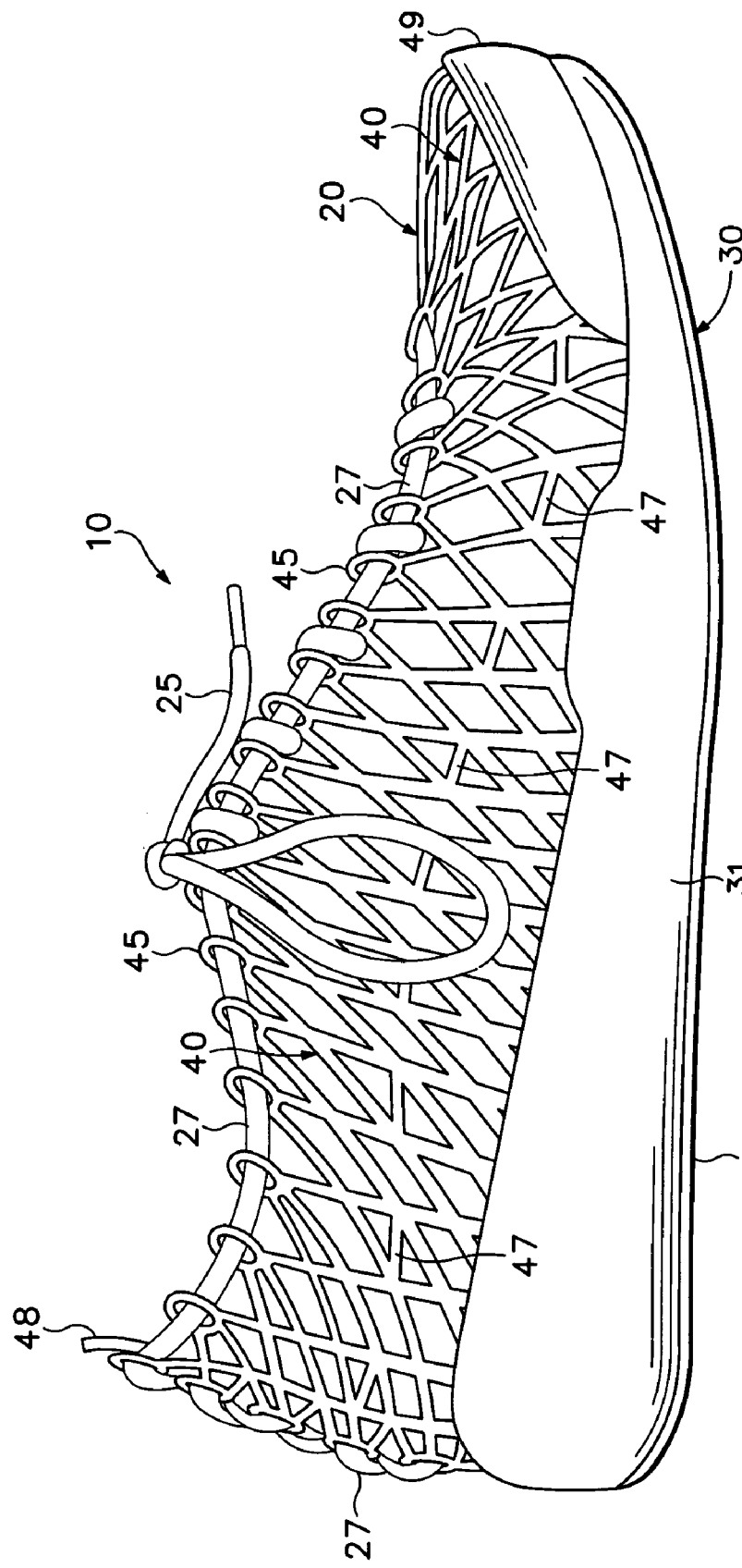
FIGS. 9A-9F are lateral side elevational views of various additional configurations for the article of footwear.

As discussed above, matrix layer 40 is configured to have greater extensibility in the direction that is parallel to edges 44a and 44b than in the direction that is perpendicular to edges 44a and 44b. In some circumstances, a lesser extensibility in the direction that is parallel to edges 44a and 44b may be desired. One manner of changing the extensibility in the direction that is parallel to edges 44a and 44b involves modifying the radian measurements of angles 46a-46d. This has an effect, however, of also changing the extensibility in the direction that is perpendicular to edges 44a and 44b. In order to change the extensibility in the direction that is parallel to edges 44a and 44b without substantially changing the extensibility in the direction that is perpendicular to edges 44a and 44b, one or more connecting members 47 may be utilized, as depicted in FIG. 9A. Connecting members 47 bisect selected apertures 43 and extend from angle 44c to angle 44d to limit the degree of stretch in these apertures 43.

Figure 9B:
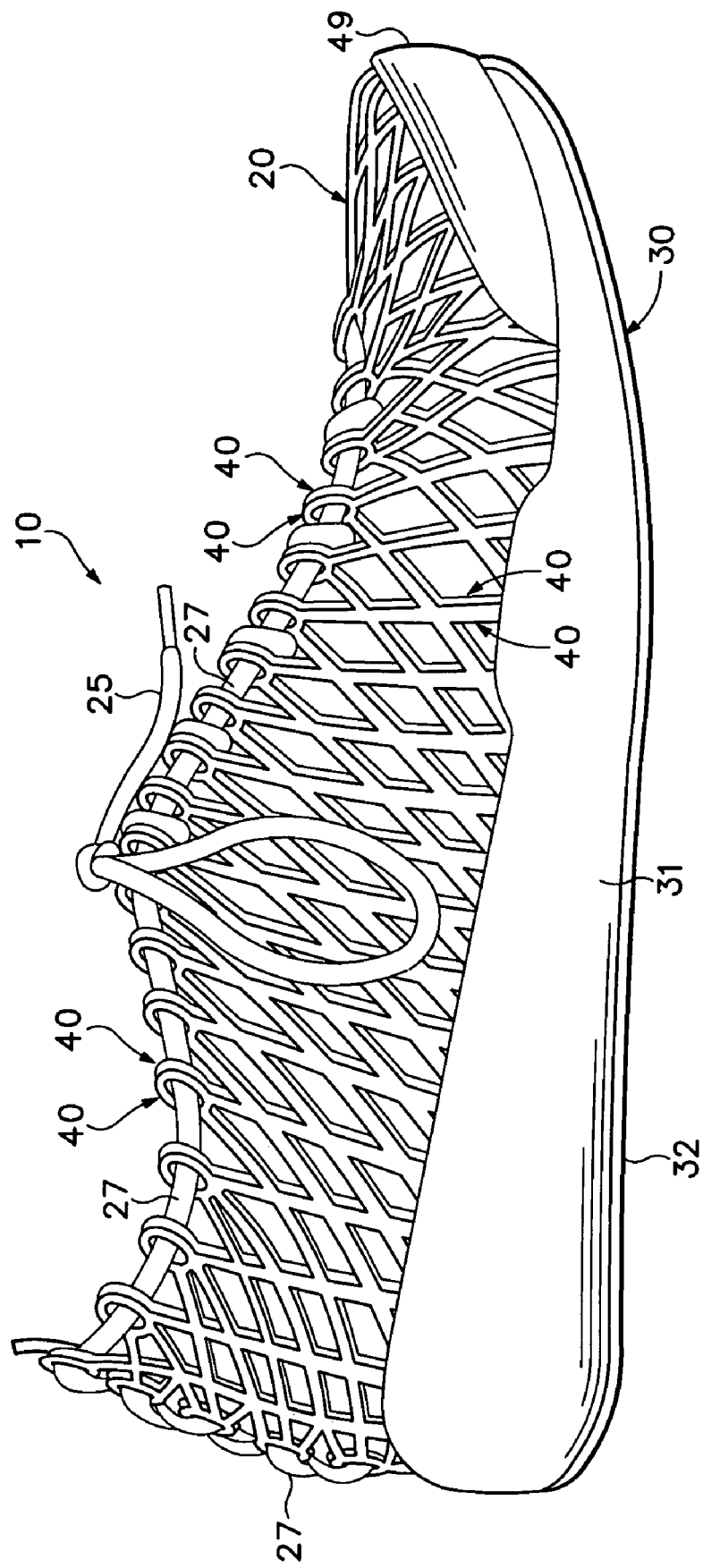

Footwear 10 is discussed above as incorporating a single matrix layer 40. With reference to FIG. 9B, a pair of matrix layers 40 are incorporated into footwear 10. One of the matrix layers 40 forms an exterior surface of upper 20, and the other matrix layer 40 forms the interior surface of upper 20. That is, the matrix layers exhibit a coextensive relationship and alternately form the exterior and interior surfaces of footwear 10. Each of matrix layers 40 may be formed from the same materials. As an alternative, the matrix layer 40 forming the exterior surface may be formed from a material that is selected to resist wear, and the matrix layer 40 forming the interior surface may be formed from a material that is selected to provide comfort or enhanced tactile qualities (e.g., to allow the wearer to go barefoot in footwear 10), for example. Accordingly, matrix layers 40 may each be formed from different materials that cooperatively impart properties beneficial to footwear 10.

Figure 9C:
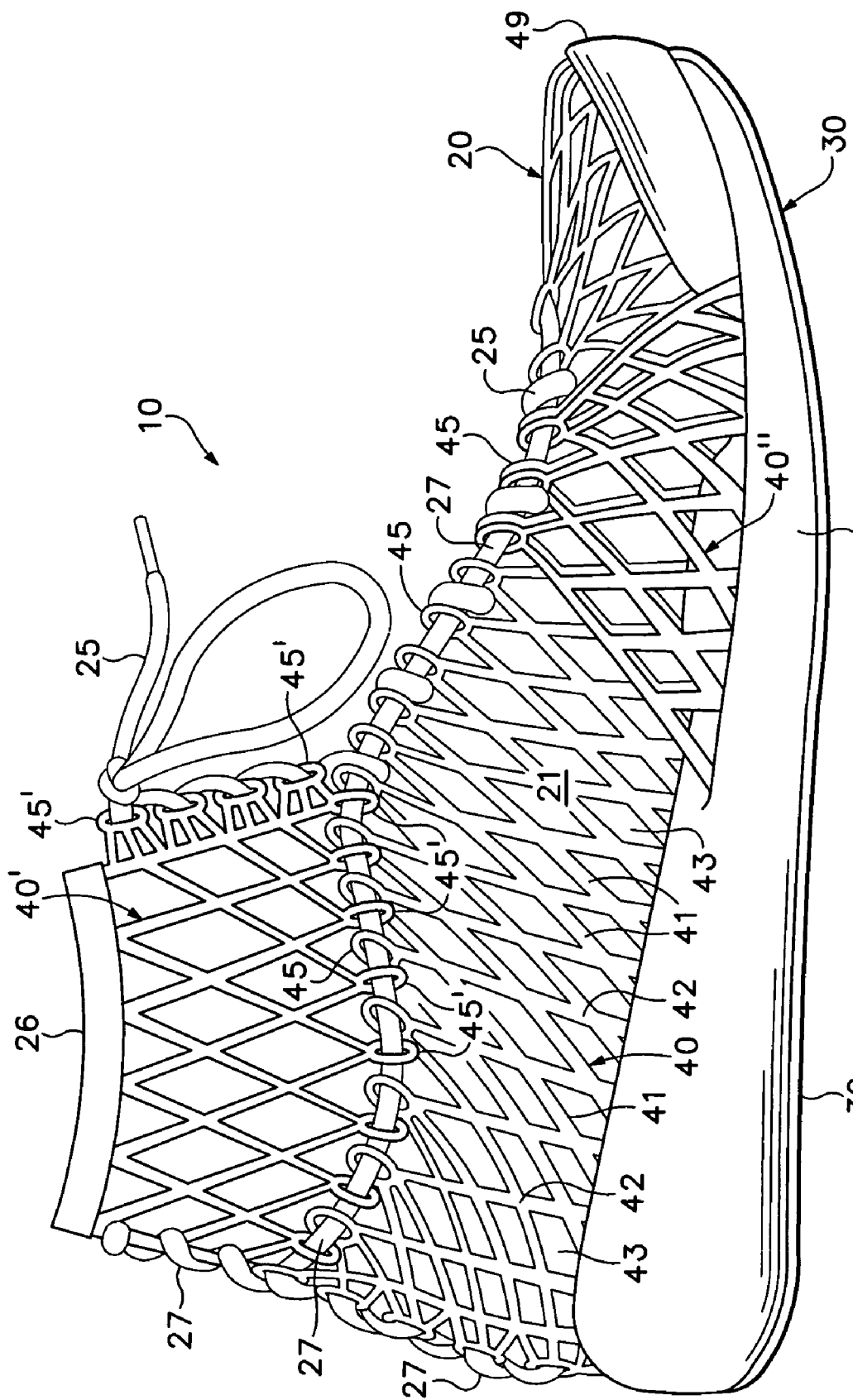

Footwear 10 is depicted in FIGS. 1-3 as has a configuration wherein ankle opening 26 extends around a lower area of the ankle. In FIG. 9C, however, footwear 10 is depicted as including an extension matrix 40' that extends around an ankle of the individual and raises the location of ankle opening 26 to an upper area of the ankle. As depicted, extension matrix 40' includes various loops 45' that are similar to loops 45 and receive cord 27, thereby joining extension matrix 40' with footwear 10. Cord 27 extends upward to join edges of extension matrix 40' along the rear surface of heel region 13, and lace 25 extends along a forward portion of extension matrix 40'. By adjusting each of cord 27 and lace 25, the manner in which matrix layer 40' fits around the ankle may be modified. Extension matrix 40' is discussed above as being an element that is separate from matrix layer 40. In some embodiments, however, extension matrix layer 40' may be formed of unitary construction with matrix layer 40.

As discussed above for matrix layer 40, cord 27 extends though loops 45 and apertures are formed between various segments 41 and cord 27 in at least throat 24. Lace 25 may then be threaded through these apertures. A similar configuration may be utilized for extension matrix 40'. As an alternative, and as depicted in FIG. 9C, lace 25 may extend directly through loops 45'. Accordingly, loops 45 and/or loops 45' may receive lace 25, rather than cord 27, to form the lacing system.

An additional feature of footwear 10 in FIG. 9C relates to a stability matrix 40" that is located on each of sides 21 and 22 and at the interface of forefoot region 11 and midfoot region 12. Stability matrix 40" overlaps a portion of matrix layer 40 and provides additional stability on the sides of the foot. As depicted, stability matrix 40" has a generally triangular shape, but may have a variety of shapes within the scope of the invention. Stability matrix 40" is depicted as being positioned at the interface of forefoot region 11 and midfoot region 12, but similar elements may be located in other areas of footwear 10. Although stability matrix 40" is depicted as being secured to an exterior of sole structure 30, stability matrix 40" may also be secured in other locations.

Figure 9D:
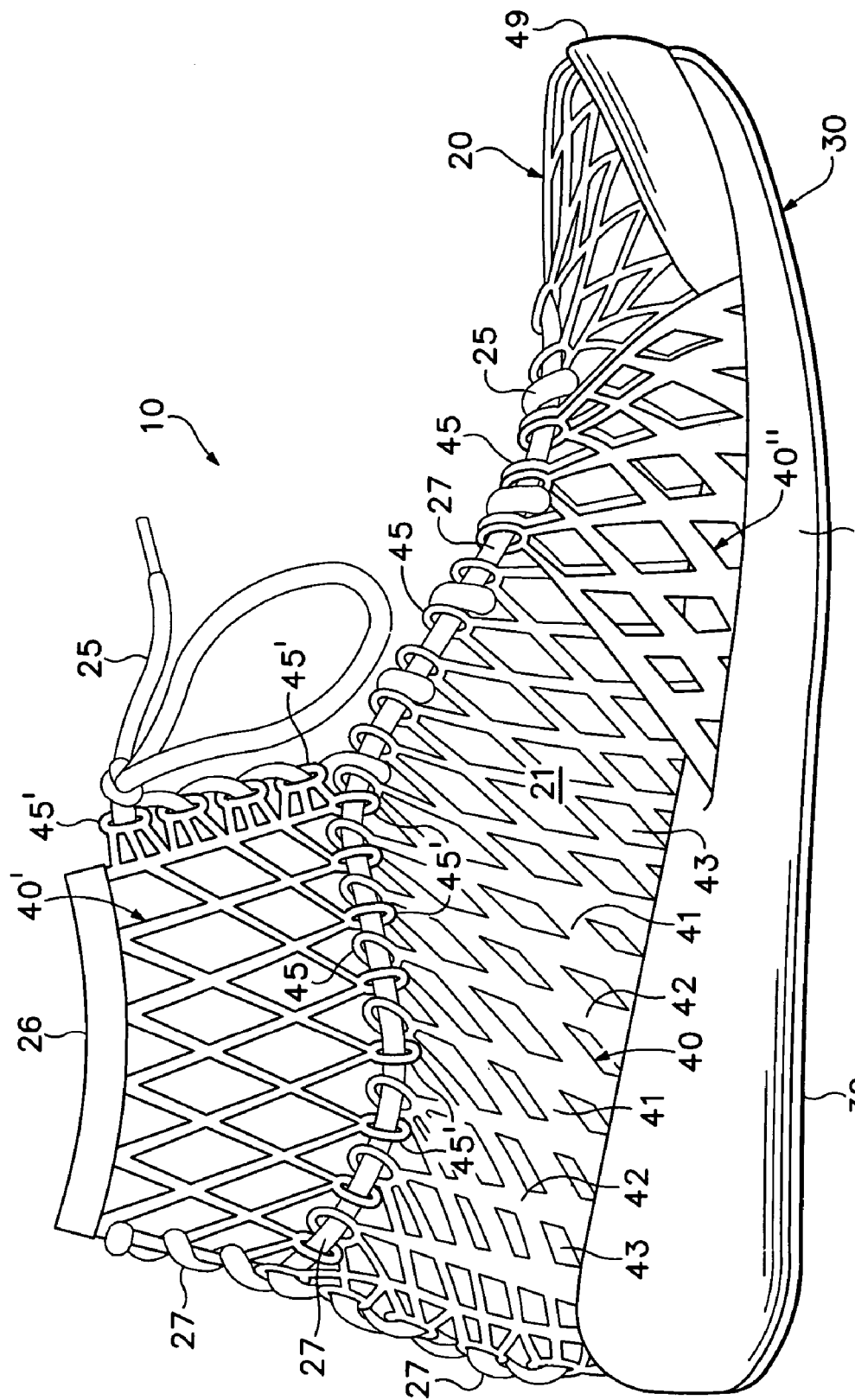

As discussed above, the thickness of segments 41 has an effect upon the degree to which matrix layer 40 stretches. In order to increase the lateral stability of footwear 10, the thickness of segments 41 may be selectively increased, as depicted in FIG. 9D, to provide additional stability during lateral movements, for example. As depicted, segments 41 in heel region 13 and portions of midfoot region 12 exhibit increased thickness. In addition, segments associated with stability matrix 40" also exhibit increased thickness. In some embodiments, other areas of matrix layer 40 and portions of extension matrix 40' may exhibit increased thickness. Accordingly, increased thickness of segments 41 may be utilized in any area of footwear 10 to impart additional stability.

Figure 9E:
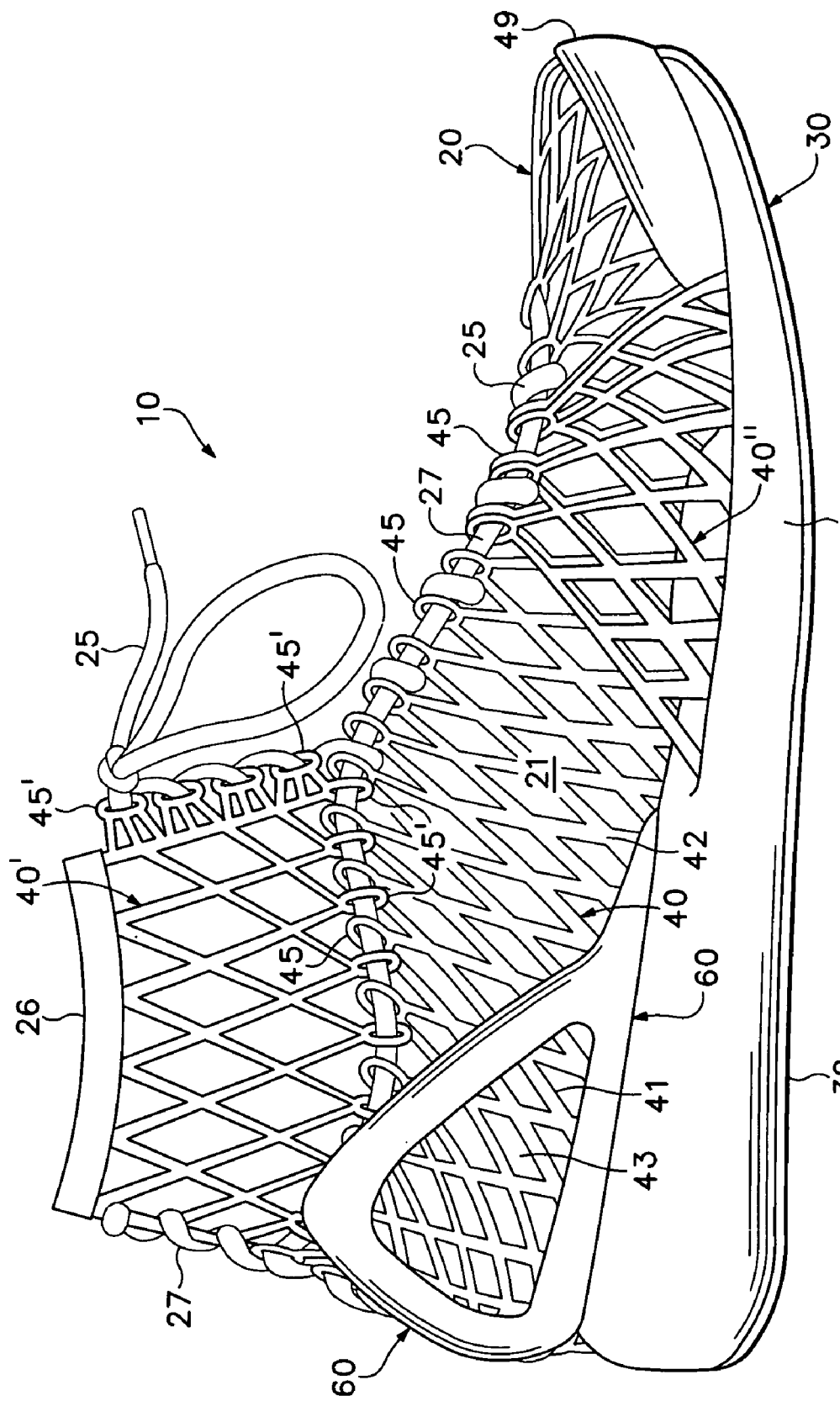

During sports such as basketball, additional stability for the heel may be beneficial during lateral movements. Increases in the thickness of segments 41 provides one manner in which additional stability may be provided. Alternatively or in combination, a reinforcing structure 60 may be incorporated into upper 20, as depicted in FIG. 9E. More particularly, reinforcing structure 60 may be secured to sole structure 30 and an exterior of matrix layer 40 so as to extend around heel region 13 and impart additional stability. In further embodiments, other configurations of reinforcing structure 60 may be located in midfoot region 12 to provide support for the arch of the foot, or other configurations of reinforcing structure 60 may be located in forefoot region 11. Accordingly, a variety of reinforcing structures may be incorporated into upper 20 in order to impart additional stability.

Figure 9F:
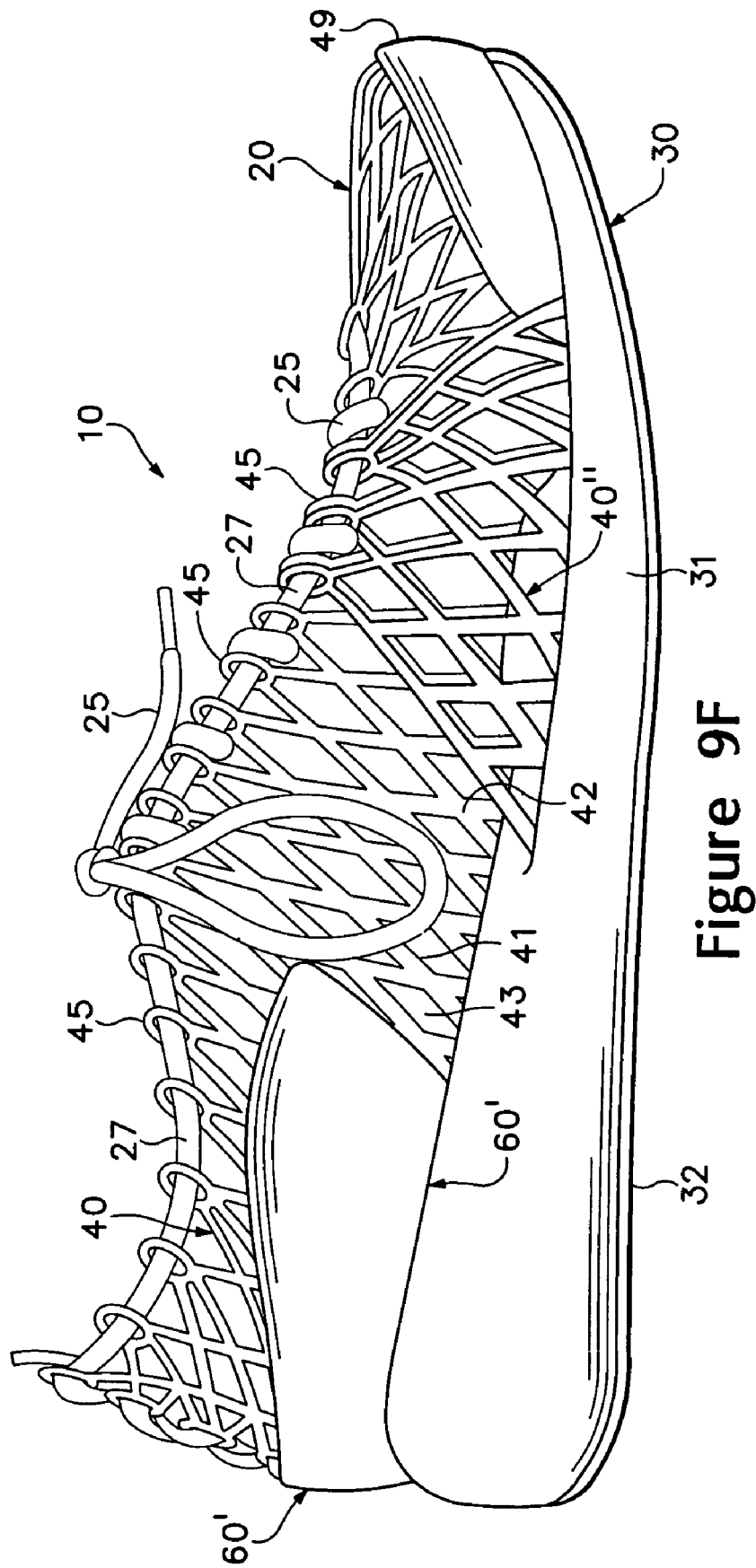

Various concepts discussed above in relation to FIGS. 9C-9E may also be applied to other configurations of footwear 10. With reference to FIG. 9F, stability matrix 40" is incorporated into footwear 10 having a configuration that is suitable for running, tennis, or cross-training, for example. Furthermore, a reinforcing structure 60' having a plate-like configuration is incorporated into heel region 13.

Figure 10A:
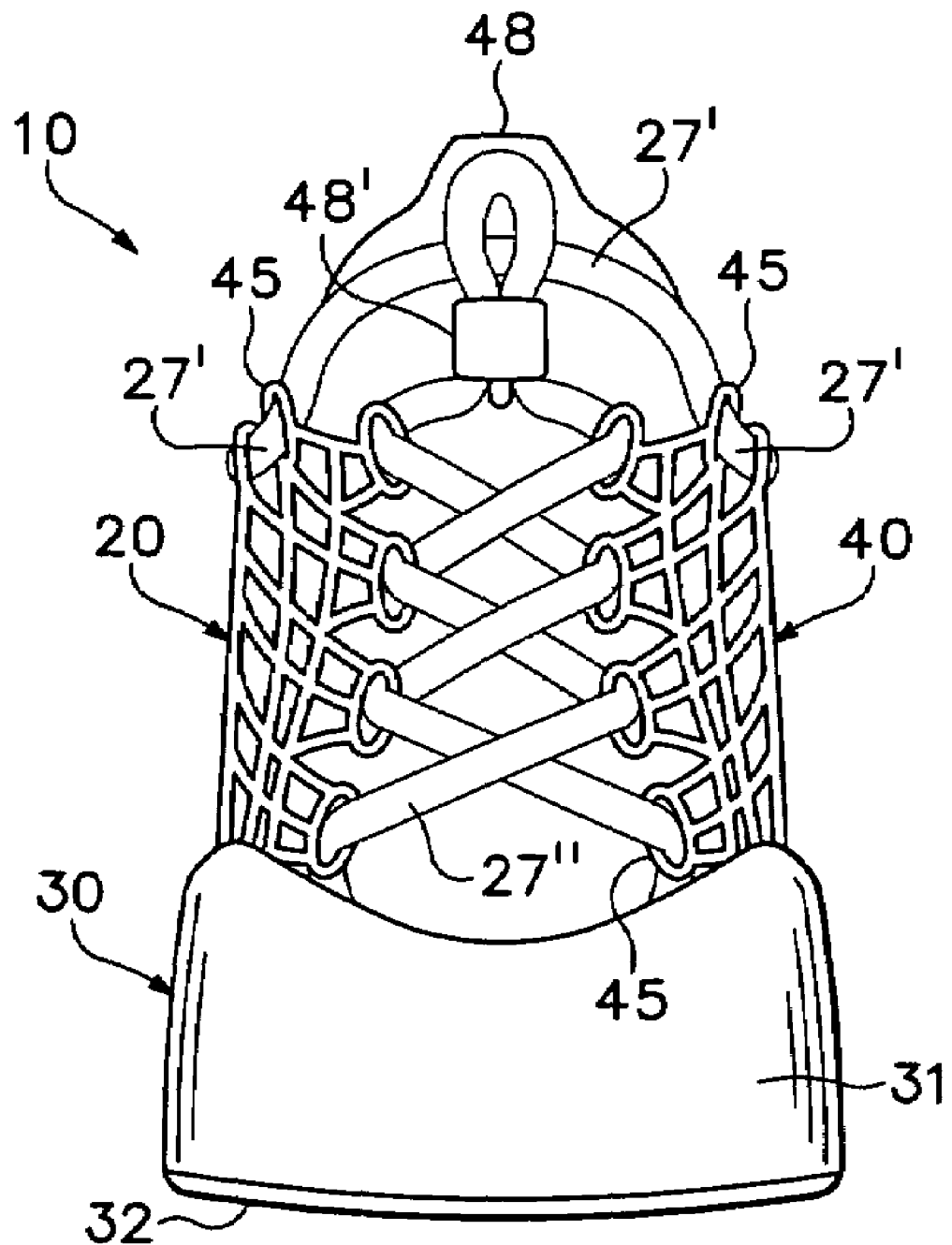
FIGS. 10A-10B are rear elevational views of an additional configuration for the article of footwear.
Figure 10B:
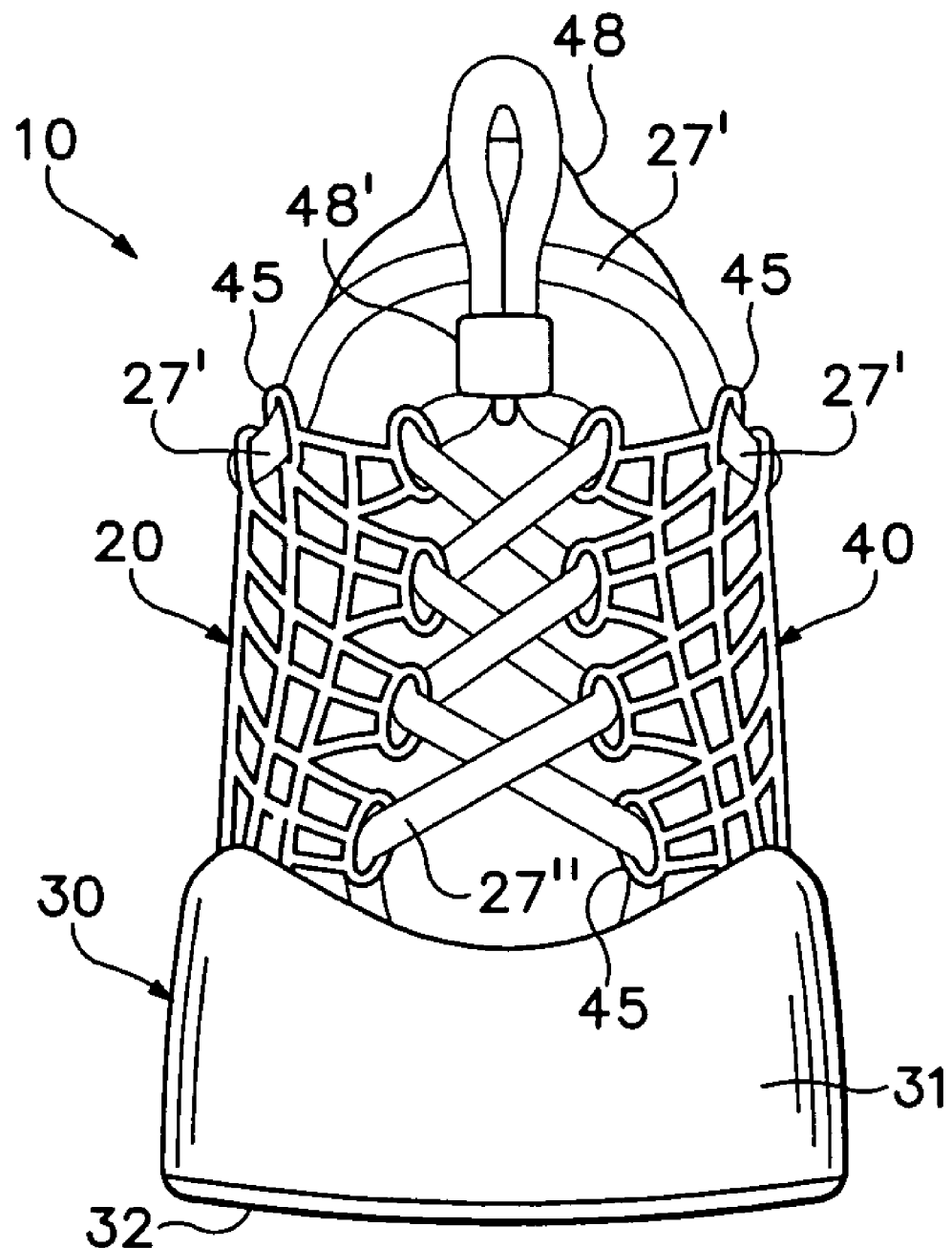

Two or more cords 27 may be utilized as an alternative to using a single cord 27. With reference to FIG. 10A, a first cord 27' may extend through loops 45 in throat 24 and through loops 45 adjacent to ankle opening 26. A second cord 27" may also extend through loops 45 that form edges 44c and 44d. In addition, second cord 27" extends through a fastener 48' that is secured to heel element 48 and cinches second cord 27" to retain the relative position of second cord 27". In this arrangement, each of the two cords 27' and 27" may be independently adjusted to enhance the fit of footwear 10. For example, the individual may pull upward on an upper portion of second cord 27" to tighten and enhance the fit in heel region 13, as depicted in FIG. 10B. Similarly, the individual may loosen second cord 27" to provide additional volume in heel region 13. In effect, tightening and loosening second cord 27" moves the relative positions of edges 44c and 44d (i.e., decreases or increases the space between edges 44c and 44d) to adjust the fit in heel region 13. In some embodiments, loops 45 along edge 44c may be formed of protrusions that extend through loops 45 along edge 44d in order to join edges 44c and 44d. Accordingly, structures other than cord 27 may be utilized to join edges 44c and 44d.

Figure 11:
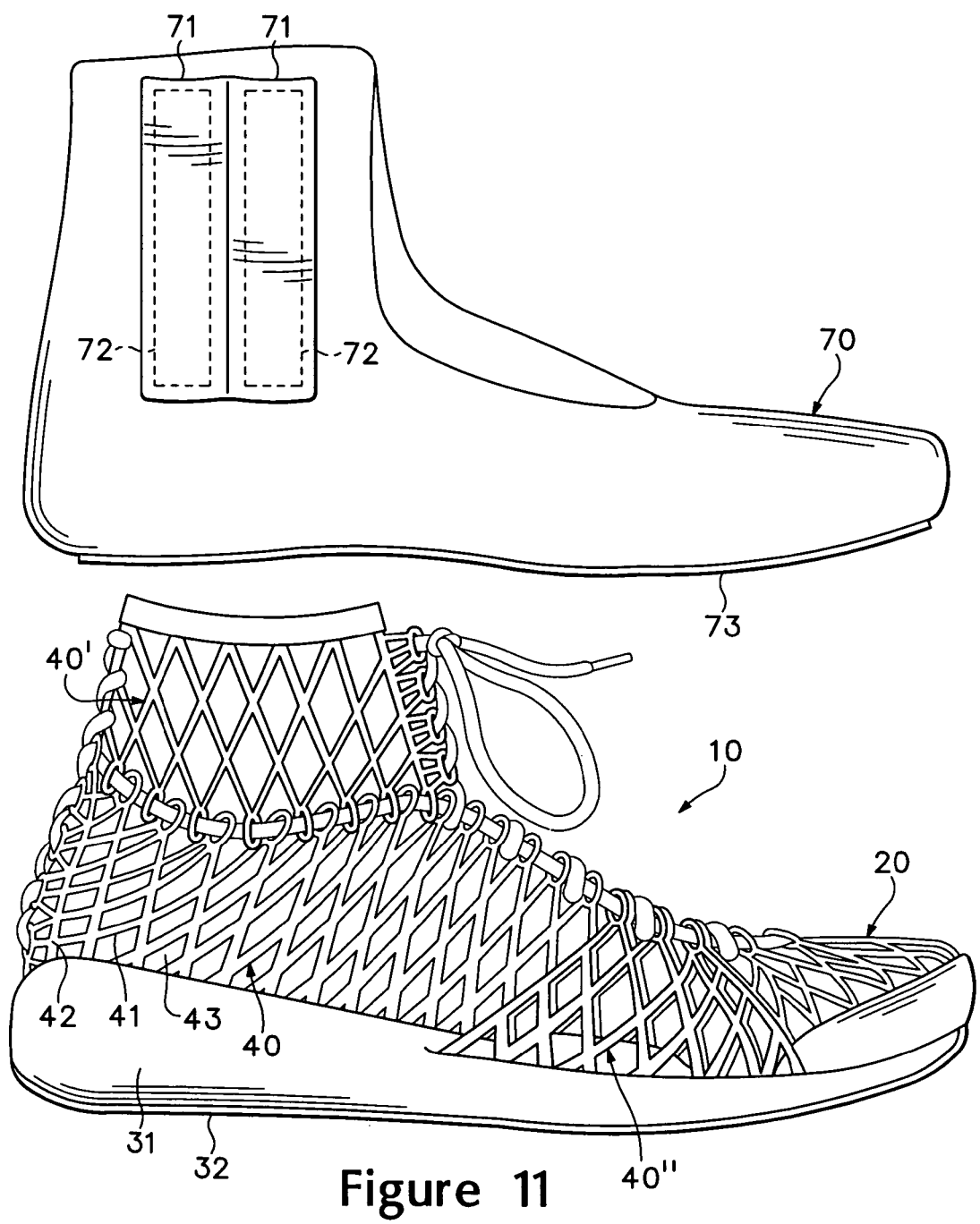
FIG. 11 is a lateral side elevational view of yet another configuration for the article of footwear.

Footwear 10 may be worn such that matrix layer 40 is immediately adjacent the foot or a sock that extends around the foot. In some embodiments, a liner 70, as depicted in FIG. 11, may extend between matrix layer 40 and the foot. Liner 70 generally has a shape that corresponds with a shape of the void defined within upper 20. In order to impart additional stability to footwear 10, a textile material forming liner 70 may have various pockets 71 that receive semi-rigid supports 72. Pockets 71 and supports 72 may extend in a generally vertical direction to provide support along the medial and lateral sides of the ankle. Alternatively, supports 72 may extend around the ankle or adjacent to the foot.

In order to prevent significant movement between upper 20 and liner 70, a lower surface of liner 70 may incorporate a fastener 73 and the interior of upper 20 may incorporate a corresponding fastener. If, for example, fastener 73 is a hook portion of a hook and loop fastening system, the loop portion may be positioned within upper 20. Fastener 73 may also be a non-slip material, such as neoprene, that is located on a lower surface of liner 70 and a lower surface of the void within upper 20. When liner 70 is placed within upper 20, fastener 73 will effectively limit further movement of liner 70 relative to upper 20, thereby securely positioning the foot. Other types of securing systems may also be utilized in place of the hook and loop fastening system of fastener 73, including snaps, buttons, and adhesives, for example. In addition, the location of fastener 73 may vary to include locations other than the lower surface of liner 70, including sides and the back surface. Accordingly, the type of fastener and location may vary significantly.

Liner 70 generally enhances the comfort of footwear 10. During some movements, portions of matrix layer 40 may exert pressures upon the foot, and liner 70 serves to distribute the pressures over a greater area of the foot. Foam materials may be incorporated into liner 70 in order to further enhance the comfort, and the materials of liner 70 may also be air permeable to cool the foot and allow for the dissipation of perspiration. The materials forming liner 70 may also be waterproof or water resistant.

Figure 12:
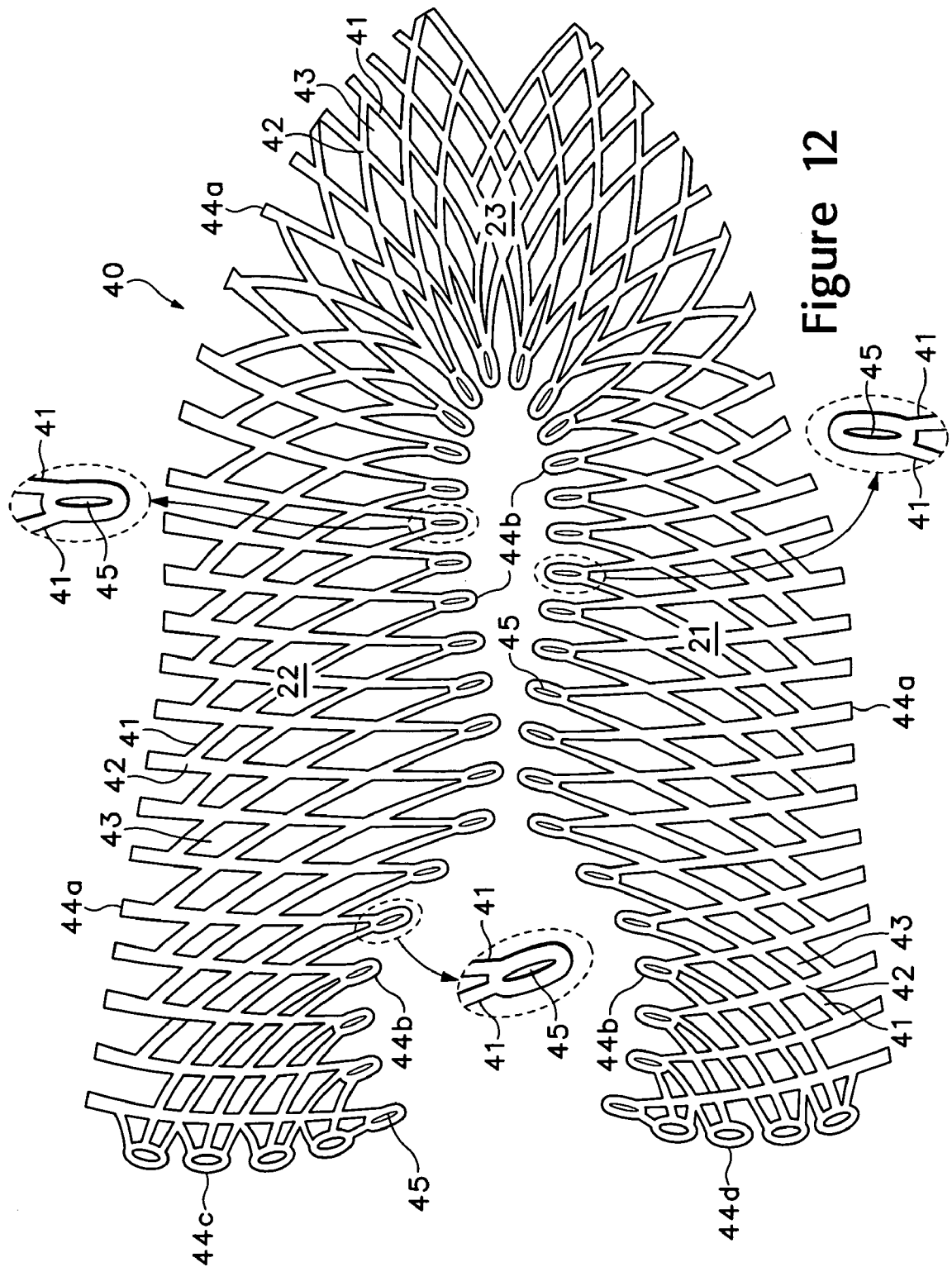
FIG. 12 is a top plan view of another configuration of the matrix layer.

When cord 27 extends through loops 45, loops 45 may twist or otherwise rotate to accommodate cord 27. Although the material forming matrix layer 40 may be sufficiently flexible to accommodate this rotation, the rotation induces additional stresses into the material of matrix layer 40. With reference to FIG. 12, matrix layer 40 is depicted as having a configuration wherein loops 45 are formed to have a twisted or rotated configuration. In FIG. 5, loops 45 are coplanar with a remainder of matrix layer 40. In contrast, FIG. 12 depicts a configuration wherein loops 45 are angled with respect to the remainder of matrix layer 40. That is, loops 45 are formed to have a twisted or otherwise rotated configuration that accommodates cord 27 without the necessity of significant additional twisting or rotation. In FIG. 12, loops 45 are depicted as being at a 45 degree angle with respect to the remainder of matrix layer 40, but may range from 5 to 90 degrees in further configurations.

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

That which is claimed is:

1. An article of footwear comprising:
    an upper including a matrix structure extending along at least one of a medial side and a lateral side of the footwear, the matrix structure being formed from a plurality of segments that cross each other to define a plurality of intersections and apertures, at least a portion of the intersections each defining a first angle and a second angle, the first angle being an acute angle oriented in a substantially vertical direction, and the second angle being an obtuse angle oriented in a substantially horizontal direction, wherein the upper further includes at least one lace-receiving opening defined by at least two segments and a cord; and
    a sole structure secured to the upper.

2. The article of footwear recited in claim 1, wherein at least a portion of the segments exhibit a curved configuration.

3. The article of footwear recited in claim 1, wherein the apertures exhibit a substantially quadrilateral shape.

4. The article of footwear recited in claim 1, wherein the matrix structure is formed from a unitary polymer element.

5. The article of footwear recited in claim 1, wherein the upper includes a plurality of lace-receiving openings that are positioned along an edge of the matrix structure, wherein the edge defines a throat area of the upper, and a lace extending through the plurality of lace-receiving openings.

6. The article of footwear recited in claim 5, wherein the edge of the matrix structure defines an ankle opening of the upper, and a plurality of loops extend from the edge of the matrix structure, wherein the cord extends through the loops.

7. The article of footwear recited in claim 1, wherein a pair of edges of the matrix structure extend vertically through an ankle area of the footwear and are positioned adjacent to each.

8. The article of footwear recited in claim 1, wherein an area of the apertures is greater than an area of the segments.

9. The article of footwear recited in claim 1, wherein a ratio of an area of the segments to an area of the apertures varies throughout the matrix structure, and the ratio in a midfoot region of the footwear is greater than the ratio in a forefoot region and a heel region of the footwear.

10. The article of footwear recited in claim 1, wherein a connecting element extends through an aperture to bisect the aperture, and the connecting element extends between two of the second pair of angles.

11. The article of footwear recited in claim 1, wherein the footwear includes another matrix structure that is partially coextensive with the matrix structure.

12. The article of footwear recited in claim 1, wherein the matrix structure defines plural loops located on an edge of the matrix structure.

13. The article of footwear recited in claim 12, wherein the cord extends through the loops.

14. The article of footwear recited in claim 12, wherein the loops are capable of being rotated with respect to a plane of a remainder of the matrix layer.

15. An article of footwear comprising:
an upper including a matrix structure that defines a first edge and an opposite second edge, the matrix structure being formed from a plurality of elongate segments that extend between the first edge and the second edge, the segments defining a plurality of intersections and apertures, the intersections being locations where two of the segments cross each other, and the apertures being areas between the segments, at least a portion of the intersections defining a first pair of angles and a second pair of angles, the first pair of angles being acute angles oriented in a direction that is substantially perpendicular to the first edge and the second edge, and the second pair of angles being obtuse angles oriented in a direction that is substantially parallel to the first edge and the second edge, wherein the upper further includes at least one lace-receiving opening defined by at least two segments and a cord; and
a sole structure secured to the upper.

16. The article of footwear recited in claim 15, wherein the matrix structure is formed from a unitary polymer element.

17. The article of footwear recited in claim 15, wherein the matrix structure has a U-shaped configuration.

18. The article of footwear recited in claim 17, wherein the U-shaped configuration of the matrix structure has a central area and a pair of side areas extending from the central area, the central area being positioned in a forefoot region of the footwear, and the pair of side areas being positioned to extend through a midfoot region and a heel region of the footwear.

19. The article of footwear recited in claim 18, wherein end portions of the pair of side areas are joined together in the heel region.

20. The article of footwear recited in claim 15, wherein a lasting element is secured to the first edge, and the lasting element extends along at least a portion of the first edge to join the matrix structure to the sole structure.

21. The article of footwear recited in claim 20, wherein the lasting element is formed from a material that is different from a material of the matrix structure.

22. The article of footwear recited in claim 20, wherein the lasting element is formed from a textile material.

23. The article of footwear recited in claim 15, wherein the first edge is positioned adjacent the sole structure the second edge defines a throat area and an ankle opening of the upper.

24. The article of footwear recited in claim 23, wherein the upper includes a plurality of lace-receiving openings that are positioned adjacent the throat area and a lace extending through the lace-receiving openings.

25. The article of footwear recited in claim 23, wherein end portions of the segments positioned adjacent the second edge define a plurality of loops, and a cord extends through the loops and around the throat area and the ankle opening.

26. The article of footwear recited in claim 25, wherein the matrix structure includes a pair of third edges that extend between the first edge and the second edge, the third edges being positioned in a heel region of the upper, and the cord joining the third edges to each other.

27. The article of footwear recited in claim 15, wherein an area of the apertures is greater than an area of the segments.

28. The article of footwear recited in claim 15, wherein a ratio of an area of the segments to an area of the apertures varies throughout the matrix structure, and the ratio in a midfoot region of the footwear is greater than the ratio in a forefoot region and a heel region of the footwear.

29. The article of footwear recited in claim 15, wherein the apertures exhibit a substantially quadrilateral shape.

30. The article of footwear recited in claim 15, wherein a connecting element extends through an aperture and in a direction that is substantially parallel to the first edge and the second edge.

31. The article of footwear recited in claim 30, wherein the connecting element extends between two of the second pair of angles.

32. The article of footwear recited in claim 15, wherein at least a portion of the segments exhibit a curved configuration.

33. The article of footwear recited in claim 15, wherein the sole structure has a first length and another article of footwear has a sole structure with a second length, the first length being less than the second length, the matrix structure of the article of footwear and a matrix structure of the another article of footwear having substantially identical dimensions, and the matrix structure of the another article of footwear being stretched in a direction that is parallel to the first edge and the second edge to accommodate the sole structure of the another article of footwear.

34. The article of footwear recited in claim 15, wherein the acute angles in a forefoot region of the footwear are less than the acute angles in a midfoot region of the footwear.

35. The article of footwear recited in claim 15, wherein the footwear includes another matrix structure that is partially coextensive with the matrix structure.

36. The article of footwear recited in claim 15, wherein the matrix structure defines plural loops located on the second edge of the matrix structure.

37. The article of footwear recited in claim 36, wherein the cord extends through the loops.

38. The article of footwear recited in claim 36, wherein a portion of at least one of the loops is rotated with respect to a plane of a remainder of the matrix layer.

39. An article of footwear comprising:
an upper having a polymer layer extending along at least a medial side and a lateral side of the footwear, the polymer layer defining a plurality of apertures with an elongate configuration oriented to extend substantially perpendicular to a longitudinal axis of the footwear, the longitudinal axis extending between a forefoot region and a heel region of the footwear, wherein the polymer layer defines a first edge and an opposite second edge, the polymer layer being formed from a plurality of segments that extend in a direction between the first edge and the second edge, the segments defining the apertures, and wherein the upper further includes at least one lace-receiving opening defined by at least two segments and a cord; and
a sole structure secured to the upper.

40. The article of footwear recited in claim 39, wherein the apertures exhibit a substantially quadrilateral shape.

41. The article of footwear recited in claim 39, wherein the apertures exhibit a substantially quadrilateral shape that defines a first pair of angles and a second pair of angles, the first pair of angles being acute angles oriented substantially perpendicular to the longitudinal axis, and the second pair of angles being obtuse angles oriented in a direction that is substantially parallel to the longitudinal axis.

42. The article of footwear recited in claim 39, wherein at least a portion of the segments exhibit a curved configuration.

43. The article of footwear recited in claim 39, wherein the polymer layer is formed from a unitary polymer element.

44. The article of footwear recited in claim 39, wherein a lasting element is secured to the first edge of the polymer layer, and the lasting element extends along at least a portion of the first edge to join the polymer layer to the sole structure, and the lasting element is formed from a material that is different from a material of the polymer layer.

45. The article of footwear recited in claim 44, wherein the lasting element is formed from a textile material.

46. The article of footwear recited in claim 39, wherein the first edge of the polymer layer is positioned adjacent the sole structure and the second edge of the polymer layer defines a throat area and an ankle opening of the upper.

47. The article of footwear recited in claim 46, wherein the upper includes a plurality of lace-receiving openings that are positioned adjacent the throat area and a lace extends through the lace-receiving openings.

48. The article of footwear recited in claim 46, wherein end portions of the segments positioned adjacent the second edge define a plurality of loops, and a cord extends through the loops and around the throat area and the ankle opening.

49. The article of footwear recited in claim 39, wherein an area of the apertures is greater than an area of the polymer layer.

50. The article of footwear recited in claim 39, wherein a ratio of an area of the polymer layer to an area of the apertures varies throughout the polymer layer, and the ratio in a midfoot region of the footwear is greater than the ratio in the forefoot region and the heel region of the footwear.

51. The article of footwear recited in claim 39, wherein the sole structure has a first length and another article of footwear has a sole structure with a second length, the first length being less than the second length, the polymer layer of the article of footwear and a polymer layer of the another article of footwear having substantially identical dimensions, and the polymer layer of the another article of footwear being stretched in a direction that is parallel to the first edge and the second edge to accommodate the sole structure of the another article of footwear.

52. The article of footwear recited in claim 39, wherein the footwear includes another polymer layer that is partially coextensive with the polymer layer.

53. An article of footwear having an upper and a sole structure secured to the upper, at least a portion of the upper comprising of a polymer layer extending along at least a medial side and a lateral side of the footwear, the polymer layer having a plurality of intersected segments that define a plurality of apertures, the apertures having an elongate configuration oriented to extend substantially perpendicular to a longitudinal axis of the footwear, the longitudinal axis extending between a forefoot region and a heel region of the footwear, wherein the upper further includes at least one lace-receiving opening defined by at least two segments and a cord.

54. The article of footwear recited in claim 53, wherein the apertures exhibit a substantially quadrilateral shape.

55. The article of footwear recited in claim 53, wherein at least a portion of the segments exhibit a curved configuration.

56. The article of footwear recited in claim 53, wherein the apertures exhibit a substantially quadrilateral shape that defines a first pair of angles and a second pair of angles, the first pair of angles being acute angles oriented substantially perpendicular to the longitudinal axis, and the second pair of angles being obtuse angles oriented in a direction that is substantially parallel to the longitudinal axis.

57. The article of footwear recited in claim 53, wherein an area of the apertures is greater than an area of the segments.

* * * * *

UNITED STATES PATENT AND TRADEMARK OFFICE
CERTIFICATE OF CORRECTION

PATENT NO. : 7,540,097 B2
APPLICATION NO. : 11/340409
DATED : June 2, 2009
INVENTOR(S) : Pamela S. Greene et al.

It is certified that error appears in the above-identified patent and that said Letters Patent is hereby corrected as shown below:

In Column 6, under Detailed Description, Line 63:
Please delete "metacarpo-phalangeal" and insert --metatarsophalangeal--.

In Column 6, under Detailed Description, Line 65:
Please delete "metacarpo-phalangeal" and insert --metatarsophalangeal--.

Signed and Sealed this

Eighteenth Day of August, 2009

David J. Kappos
*Director of the United States Patent and Trademark Office*